United States Patent
Yamaoka et al.

(10) Patent No.: US 6,630,109 B2
(45) Date of Patent: *Oct. 7, 2003

(54) CONTROL APPARATUS FOR REFORMER AND METHOD OF CONTROLLING REFORMER USING CONTROL APPARATUS

(75) Inventors: Masaaki Yamaoka, Toyota (JP); Masashi Yamashita, Nishikamo-gun (JP); Kiyomi Nagamiya, Toyota (JP); Yoshikazu Motozono, Nishikamo-gun (JP); Iwao Maeda, Nagoya (JP); Masayoshi Taki, Kounan (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/351,291

(22) Filed: Jul. 12, 1999

(65) Prior Publication Data

US 2001/0047622 A1 Dec. 6, 2001

(30) Foreign Application Priority Data

Jul. 16, 1998 (JP) ............................................. 10-201927
Dec. 18, 1998 (JP) ............................................. 10-361713

(51) Int. Cl.$^7$ ................................................. G05D 7/00
(52) U.S. Cl. ........................ 422/111; 422/105; 422/107; 422/108; 422/110; 422/112; 422/116
(58) Field of Search ............................... 422/105, 107, 422/108, 110, 111, 112, 116; 73/199; 429/19, 17, 13

(56) References Cited

U.S. PATENT DOCUMENTS

| | | | | |
|---|---|---|---|---|
| 4,132,530 A | * | 1/1979 | Schwimmer | ................. 585/263 |
| 4,246,773 A | * | 1/1981 | Haruta | ....................... 73/24.01 |
| 4,988,283 A | * | 1/1991 | Nagasawa et al. | ............. 429/17 |
| 5,401,589 A | | 3/1995 | Palmer et al. | ................. 429/13 |
| 5,417,051 A | * | 5/1995 | Ankersmit et al. | ........ 60/39.02 |
| 5,658,681 A | * | 8/1997 | Sato et al. | ..................... 429/13 |

FOREIGN PATENT DOCUMENTS

| | | |
|---|---|---|
| EP | 0 798 798 A | 10/1997 |
| JP | A-61-101969 | 5/1986 |
| JP | B2-7-105240 | 11/1995 |
| JP | A-8-45521 | 2/1996 |

* cited by examiner

Primary Examiner—Jerry D. Johnson
Assistant Examiner—Basia Ridley
(74) Attorney, Agent, or Firm—Oliff & Berridge, PLC

(57) ABSTRACT

A control apparatus for a reformer and a method of controlling the reformer are provided. The reformer gasifies a reformate fuel by a reforming reaction, supplies the obtained reformate gas to an energy converter to convert the reformate gas into energy of another form, and heats the reformate fuel by burning emission containing unreacted flammable gas produced in the energy converter. The control apparatus comprises a reforming amount assessing device for assessing the amount of the reformate fuel to be gasified, and an emission amount assessing device for assessing the amount of emission to be supplied into the reformer on the basis of the assessed amount of reformate fuel. When using the unreacted hydrogen gas generated in a fuel cell for heating the reformate fuel, the unreacted hydrogen gas and combustion aid gas can be controlled so that the reformate fuel is heated properly.

17 Claims, 16 Drawing Sheets

CONTROL APPARATUS FOR REFORMER AND METHOD OF CONTROLLING REFORMER USING CONTROL APPARATUS

BACKGROUND OF THE INVENTION

1. Field of Invention

The present invention relates to a reformer for reforming reformate fuel into a desired fuel such as hydrogen-rich gas, and more particularly to an apparatus for controlling the temperature of such reformate fuel. This invention also relates to a method of controlling a reformer using the apparatus.

2. Description of Related Art

A reformer for generating gas mainly composed of hydrogen gas by using methyl alcohol (methanol) and water as reformate fuel materials is known. In this reformer, a copper alloy or the like is used as catalyst, and the active temperature of the catalyst is, for example, 280° C., and when the temperature is lower than the activation temperature, the methanol is not reformed sufficiently, and the amount of residual methanol in the reformate gas increases. Moreover, because the reforming reaction of methanol is an endothermic reaction, heat is supplied from an external source in order to promote the reforming reaction as well as to maintain the catalyst temperature.

The heating method includes, aside from heating by a burner, a method of generating heat by an oxidation reaction and transferring the heat to the reforming portion. The latter method is a so-called partial oxidation reaction method, in which, for example, air is mixed in methanol vapor, and it is oxidized in the presence of catalyst to generate hydrogen, and the heat generated at this time is utilized. Therefore, by utilizing this partial oxidation reaction, the heat accompanying reforming reaction is replenished by the partial oxidation reaction, and the heat absorption and heat generation are balanced, so that heating from an external source is not necessary. In this method, however, only the thermal balance is achieved in the reforming portion so as not to cause temperature changes due to reforming or oxidation, and it is not intended to be applied to setting of the reforming portion to a desired temperature.

That is, to set the temperature of the reforming portion to an appropriate temperature for the reforming reaction or catalyst activity, heating from an external source is required. Accordingly, in this kind of reformer, by the heat generated in the combustion portion, steam of a specified temperature is obtained from a mixture of methanol and water, and the steam is supplied into the reforming portion.

When this reformer is used, for example, to generate fuel gas in a fuel cell, it is necessary to control the reaction in the reformer depending on variation of load of the fuel cell. That is, along with an increase of load, the production of reformate gas must be increased. When the load drops, the production of reformate gas must be decreased. To increase or decrease the generation of reformate gas, it is required to increase or decrease the material to be supplied to the reforming portion, that is, the mixed steam of methanol and water, but for this purpose it is necessary to increase or decrease the heating calorific value for generating the mixed steam of methanol and water at a desired temperature.

The amount of heat required to generate a mixed steam of methanol and water can be controlled by increasing or decreasing the amount of fuel for heating such as methanol. However, the burner or heat generating device using an oxidation catalyst conventionally used as a heating device for heating the mixture of methanol and water is low in the response of heat generation, and it is hence difficult to control heating promptly coping with load fluctuations in such known reformers. That is, in the event of a sudden load increase, the heat generation is insufficient for the amount of methanol and water to be heated, and the steam temperature or catalyst temperature drops. Consequently, the reforming reaction becomes dull, or the residual methanol amount in the reformate gas increases, and the performance of the fuel cell declines. To the contrary, if the load drops suddenly, due to delay in drop of heating amount, the steam temperature or catalyst temperature may elevate excessively, and the activity of the catalyst is lowered.

To eliminate such disadvantage, the invention disclosed in Japanese Patent Publication No. HEI 7-105240 is intended to control the temperature depending on load fluctuations by controlling the steam ratio. That is, by decreasing the amount of water mixed as reformate fuel, the amount of heat required for heating and evaporation drops, and the temperature of the mixed steam of methanol and water as reformate fuel rises. However, when the amount of water is increased, the amount of heat required for raising the temperature and evaporating increases, so that the temperature of the mixed steam of methanol and water as reformate fuel declines.

The method of temperature control disclosed in this publication comprises changing the amount of water, changing the amount of heat consumed or absorbed by the water, and thereby controlling the temperature. Therefore, as compared with the method of controlling the heat generation amount by changing the amount of fuel for combustion, the response of temperature control is improved. This published method, however, consumes part of the heat generated for heating and evaporation on the condition that the heat generation by combustion of the fuel is constant. For example, in the case of lowering the reformate gas amount due to small fluctuations in the fuel cell, the amount of heat generation by combustion is maintained higher than the amount of heat determined theoretically. As a result, the combustion is controlled to generate more heat than the heat actually required for reforming the reformate fuel, and the fuel is consumed more than necessary, and thus the fuel economy drops. Also in this published invention, spent fuel containing residual hydrogen is used as a part of the fuel for heating the reformate fuel, and the reformate fuel is heated by burning the residual hydrogen by a burner. Yet, if the reformate fuel is heated by burning the residual hydrogen by a burner, the amount of heat is not controlled. Thus, because the temperature is controlled by the steam ratio, the consumption of the heating fuel containing residual hydrogen that is required is more than the amount needed for heating of reformate fuel. In this respect, also, the residual hydrogen is consumed excessively, and thus this known method has been susceptible to improvement in a more effective use of fuel.

SUMMARY OF THE INVENTION

The invention has been made in the light of the above-described background. It is an object of the present invention to provide a control apparatus that can control combustion fuel for heating reformate fuel, control the reformate fuel temperature to a desired temperature suitable for the reforming reaction, and utilize the reformate fuel effectively.

To achieve this object, the invention uses unreacted flammable gas in the emission resulting from energy conversion of reformate gas for heating of reformate fuel, and controls the amount of unreacted flammable gas for combustion for heating at an appropriate amount depending on the required amount of reformate fuel, as well as on other factors.

In a first aspect of the invention, a control apparatus is provided for controlling a reformer. The reformer can comprise a reformate gas generator that gasifies a reformate fuel by a reforming reaction, the combustion portion that heats the reformate fuel by burning the emission including unreacted flammable gas generated at the time of conversion of the reformats gas obtained from the reformate gas generator into another energy form by an energy converter. The control apparatus comprises a reformed amount assessing device that assesses the amount of reformate fuel to be gasified, and an emission amount assessing device that assesses the amount of emission to be supplied into a combustion portion on the basis of the assessed reformate fuel amount.

Therefore, according to the invention, when the amount of the reformate fuel varies depending on fluctuations of load in the energy converter or the like, the amount of emission including the unreacted flammable gas to be supplied into the reformer accordingly is assessed. By supplying the assessed amount of emission into the reformer, the unreacted flammable gas contained in the emission burns, and the reformate fuel is heated. In this case, because the amount of the reformate fuel and the amount of flammable gas to burn correspond to each other, the reformate fuel is heated to a desired temperature. As a result, the flammable gas is not consumed more than necessary, and the reformate fuel temperature can be controlled to a desired temperature. Moreover, the reforming reaction proceeds desirably, and the reformate gas of high quality is obtained.

Moreover, in other embodiments, the control apparatus can also comprise a heat detector that detects a shortage in the amount of heat for burning the emission including the unreacted flammable gas in the combustion portion necessary for heating the reformate fuel, and a fuel supplying device that supplies the heating fuel into the combustion portion if a shortage of heat is detected.

According to such embodiments, if the necessary amount of heat to be generated in the combustion portion exceeds the amount of heat obtained by combustion of unreacted flammable gas, the heating fuel is supplied into the combustion portion. Therefore, the heating fuel is used only when the amount of heat generated is insufficient by the use of unreacted flammable gas only, and the unreacted flammable gas is used to the maximum extent for heating of the reformate fuel, so that the consumption of heating fuel is decreased, and the energy efficiency is enhanced on the whole.

Additionally, in embodiments, the control apparatus can also comprise a combustion portion temperature detector that detects the temperature of the combustion portion, and a heating fuel adjuster that adjusts (decreases) the amount of heating fuel consumed in the combustion portion on the basis of the detected temperature of the combustion portion.

According to such embodiments, if the temperature of the reformate fuel is higher than necessary, supply of heating fuel into the combustion portion is stopped. As a result, it is possible to prevent a drop of energy efficiency due to excessive combustion of the heating fuel, or a drop of reforming reaction efficiency due to an excessive elevation of temperature of the reformate fuel.

Preferably, the control apparatus further comprises a reformate fuel temperature detector that detects the temperature of the reformate fuel heated in the combustion portion, and a heating fuel arrester that stops supply of heating fuel to the combustion portion when the detected temperature of the reformate fuel exceeds a predetermined temperature.

In such embodiments, when the temperature of the combustion portion becomes higher than the predetermined temperature, the amount of material consumed in the combustion portion decreases, and the heating amount in the combustion portion decreases. Accordingly, abnormal temperature rise of the combustion portion and related damage can be prevented.

In addition to the constitution of the first aspect, the control apparatus can also comprise a flammable gas amount estimator that estimates the amount of unreacted flammable gas in the emission, on the basis of the reformate fuel amount reformed to supply into the energy converter and the load of the energy converter.

In such embodiments, the amount of the unreacted flammable gas used in heating of reformate fuel is more accurate, control of the heating temperature of the reformate fuel is precise, and the unreacted flammable gas can be utilized effectively.

Preferably, the control apparatus further comprises a reformate fuel temperature detector that detects the temperature of the reformate fuel supplied for the reforming reaction, and a temperature adjuster that adjusts the emission amount to be supplied into the reformer on the basis of the detected temperature of the reformate fuel.

According to such embodiments, when the temperature of the reformate fuel is low, or high, the emission amount, that is, the unreacted flammable gas amount, consumed can be increased or decreased. As a result, the temperature of the reformate fuel is adjusted, and a suitable temperature is obtained.

In addition to the constitution of the first aspect, it may also comprise a delay adjustor that adjusts the emission amount to be supplied to the reformer, on the basis of the time delay until the reformate fuel supplied in the reformer is gasified.

According to such embodiments, prior to sufficient supply of reformate fuel, if the unreacted flammable gas is burned relatively much, or to the contrary if the reformate fuel decreases, it is possible to avoid a decrease of the combustion amount of unreacted flammable gas in advance, so that the heating temperature of the reformate fuel is optimized.

In addition to the constitution of the first aspect, the control apparatus can also comprise a combustion aid gas amount determiner that determines the amount of a combustion aid gas for burning the flammable gas in the emission supplied into the reformer, on the basis of the amount of the unreacted flammable gas supplied into the reformer.

According to such embodiments, the combustion aid gas is supplied into the reformer depending on the amount of the flammable gas supplied for heating the reformate fuel. As a result, the rate of two gas amounts is appropriate, and a desired heating calorific value is obtained, so that the heating temperature of the reformate fuel is optimized.

The control apparatus can further comprise a heating temperature detector that detects the temperature for heating the reformate fuel to be supplied for the reforming reaction, and a temperature adjuster that adjusts the amount of combustion aid gas to be supplied into the reformer on the basis of the detected heating temperature.

According to such embodiments, when the heating temperature is low, for example, the combustion aid gas amount is decreased and the heat taken away by the combustion aid gas is decreased, so that the temperature of the reformate fuel is raised. When the heating temperature is high, for example, the combustion aid gas amount is increased and the heat taken away by the combustion aid gas is increased, so that the temperature of the reformate fuel is lowered. As a result, the heating temperature of the reformate fuel is optimized.

The control apparatus can further comprise a delay adjustor that adjusts the combustion aid gas amount to be supplied into the reformer on the basis of the delay until the reformats fuel supplied into the reformer is gasified.

According to such embodiments, the heat value given to the reformate fuel by combustion of unreacted flammable gas is changed by the amount of combustion aid gas, and this change occurs depending on the delay of supply of reformate fuel, or on the delay of decrease of supply amount. As a result, the reformate fuel can be heated to an appropriate temperature.

Preferably, the control apparatus can also comprise an A/F detector that detects the ratio of the flammable gas amount to be consumed for heating the reformate fuel and the amount of combustion aid gas for burning the flammable gas, and an A/F adjuster that adjusts the emission amount to be supplied into the reformer.

According to such embodiments, therefore, a surplus or shortage of combustion aid gas amount is adjusted, and the unreacted flammable gas is burned as desired, so that the heating temperature of the reformate fuel is optimized.

Preferably, the control apparatus can comprise a first temperature detector that detects the temperature at the supply side of combustion aid gas of the combustion portion, a second temperature detector that detects the temperature at the exhaust side of the combustion portion, and a combustion aid gas amount controller that increases the supply amount of the combustion aid gas when the temperature at the supply side of combustion aid gas detected by the first temperature detector is higher than the temperature at the exhaust side detected by the second temperature detector, and that decreases the supply amount of the combustion aid gas when the temperature at the supply side of combustion aid gas detected by the first temperature detector is lower than the temperature at the exhaust side detected by the second temperature detector.

According to such embodiments, when the temperature at the inflow side of the combustion portion is high, the supply amount of combustion aid gas increases, and the amount of heat taken away by the combustion aid gas increases and the combustion temperature is lowered. To the contrary, when the temperature at the exhaust side is high, the supply amount of combustion aid gas is decreased, and the amount of heat taken away from the inflow side of the combustion aid gas is decreased, such that the heat value sent to the exhaust side declines, the temperature at the inflow side of the combustion aid gas elevates, and the temperature at the exhaust side drops. Ultimately, the temperature in the inflow side and exhaust side of the combustion aid gas is balanced, and local overheating is prevented.

A second aspect of the invention provides a control apparatus for a reformer. The reformer can comprise a reformate gas generator that gasifies a reformate fuel by a reforming reaction, and a combustion portion that heats the reformate fuel and supplies into the reformate gas generator by burning the emission including the unreacted flammable gas generated at the time of conversion of the reformate gas by the reformate gas generator into energy of other form by an energy converter. The control apparatus comprises a reformed amount assessing device for assessing the amount of reformate fuel to be gasified; a flammable gas amount assessing device that assesses a necessary amount of flammable gas supplied into the combustion portion on the basis of the assessed amount of reformate fuel; and an emission amount assessing device that assesses the emission amount to be supplied into the combustion portion on the basis of the assessed necessary amount of flammable gas.

According to the second aspect, the amount of the reformate fuel to be gasified is assessed depending on the load at the energy converter or the like, and the amount of flammable gas necessary for heating the reformate fuel is assessed on the basis of the assessed reformate fuel amount. The emission amount including the necessary amount of flammable gas is assessed. Therefore, the unreacted flammable gas for heating the reformate fuel can be used, and the reformate fuel is heated appropriately by the unreacted flammable gas, so that a favorable reforming reaction takes place, thereby obtaining a reformate gas of high quality. At the same time, the fuel can be utilized effectively.

In addition to above-described embodiment of the second aspect, the control apparatus can further comprise a combustion aid gas amount assessing device that assesses the amount of combustion aid gas to be supplied together with the unreacted flammable gas into the reformer, on the basis of the amount of flammable gas assessed by the flammable gas assessing device.

According to such embodiments, the unreacted flammable gas supplied together with emission can be effectively burned so that the heating temperature of the reformate fuel can have a desired temperature, the temperature of the reformate fuel and the accompanying reforming reaction are favorable, and a reformate gas of high quality is obtained.

A third aspect of the invention relates to a control apparatus for a reformer. The reformer can comprise a reformate gas generator that gasifies a reformate fuel by a reforming reaction, and a combustion portion that burns a combustion material, heats the reformate fuel and supplies it into the reformate gas generator. The control apparatus comprises a target combustion temperature setting device that sets the target combustion temperature in the combustion portion on the basis of the target temperature of the reformate fuel, and a combustion material amount setting device that sets the amount of combustion material to be consumed in the combustion portion on the basis of the target combustion temperature determined in the target combustion temperature setting device.

According to the third aspect, because the amount of combustion material supplied into the combustion portion is set on the basis of the target combustion temperature, an abnormally high temperature in the combustion portion is prevented, and damage of the combustion portion is avoided. Moreover, because the target combustion temperature is determined on the basis of the target temperature of the reformate fuel, the reforming combustion temperature is optimized, and the reforming reaction takes place efficiently.

DETAILED DESCRIPTION OF PREFERRED EMBODIMENTS

Figure 20:
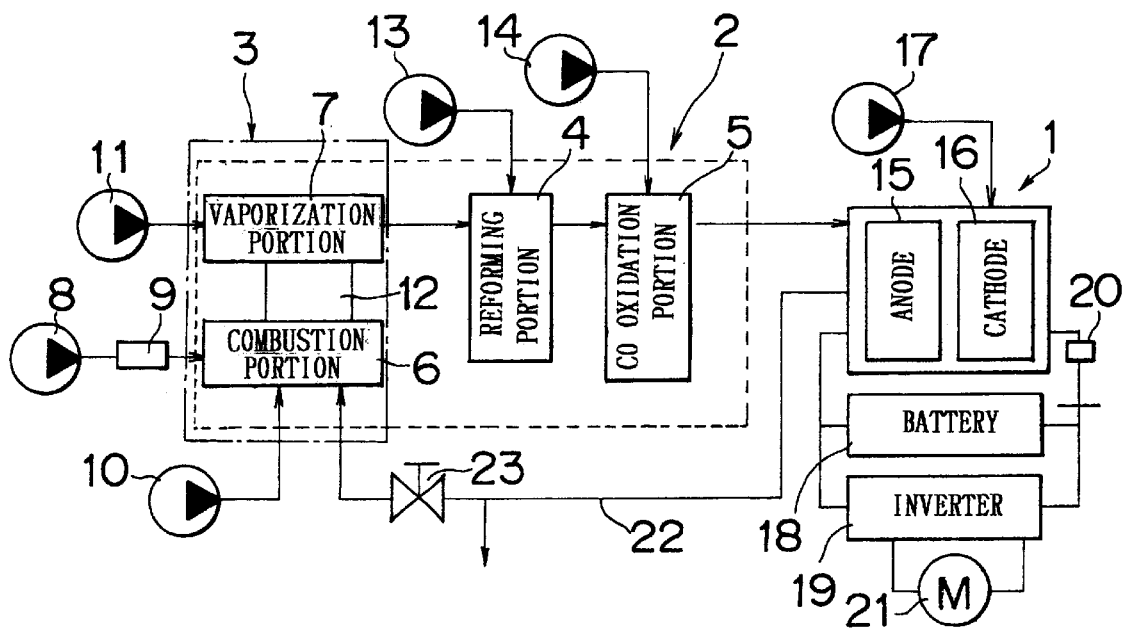
FIG. 20 is a diagram schematically showing a system connecting a reformer to a fuel cell.

The invention is further described below while referring to illustrated preferred embodiments thereof. First, as a reformer, using methanol and water as reformate fuel, a system of employing an energy converter for converting the reformate gas generated from the reformer into another form as a fuel cell is described. FIG. 20 schematically shows an exemplary system, in which a reformer 2 is connected to the anode side of a fuel cell 1. The reformer 2 includes a heating portion 3 for heating the reformate fuel, a reforming portion 4, and a carbon monoxide (CO) oxidizing portion 5. The reformer 2 reforms the mixture of methanol and water into hydrogen and carbon dioxide.

The heating portion 3 heats the reformate fuel, and produces a mixed steam of methanol and water. The heating portion 3 comprises a combustion portion 6 for generating heat for heating, and a vaporizing portion 7 for evaporating the reformate fuel by its heat. The combustion portion 6 can comprise a device for burning the heating fuel by a burner, or a catalyst for oxidizing the heating fuel. Therefore, to this combustion portion 6, a pump 8 for supplying methanol, an example of the heating fuel, is connected through an injector 9. An air feed portion 10 for supplying air, as an example of combustion aid gas, to the combustion portion 6 is provided. The air feed portion 10 typically comprises an air pump.

The vaporizing portion 7 is provided with a pump 11 as a reformate fuel feed portion for supplying a mixture of methanol and water. The vaporizing portion 7 and the combustion portion 6 are connected to each other through a heat exchanger 12 so as to transfer heat. A more specific embodiment of the heating portion 3 is described below.

The reforming portion 4 generates a hydrogen-rich gas by a reforming reaction substantially between methanol and water. More specifically, using a copper compound catalyst at an active temperature of about 280° C., a reformate gas substantially comprising hydrogen gas is generated by a reforming reaction expressed in the following equation (1):

$$CH_3OH + H_2O \rightarrow CO_2 + 3H_2 \qquad (1)$$

The reforming portion 4 generates hydrogen gas and heat by a partial oxidation reaction of methanol, and air is supplied from an air feed portion 13 for this purpose. That is, the reforming reaction shown in the equation (1) is an endothermic reaction. In contrast, the reaction in equation (2) below, which is a partial oxidation reaction of methanol, is an exothermic reaction. Therefore, by balancing the endothermic amount and the exothermic amount, the temperature of the reforming portion 4 is maintained substantially constant.

$$CH_3OH + \tfrac{1}{2}O_2 \rightarrow 2H_2 + CO_2 \qquad (2)$$

The reforming reaction shown in equation (1) and the partial oxidation reaction shown in equation (2) are reactions that occur in an ideal state. Moreover, as carbon dioxide is reversibly changed into carbon monoxide, carbon monoxide is inevitably mixed into the reformate gas. This carbon monoxide can poison the catalyst of the anode 15 in the fuel cell 1, and the CO oxidation portion 5 is provided for removing the carbon monoxide. The CO oxidation portion 5 includes a CO oxidizing catalyst (not shown), and also includes an air feed portion 14. By passing the reformate gas generated in the reforming portion 4, the carbon monoxide contained in the reformate gas is oxidized by the oxygen in the air and converted to carbon dioxide.

On the other hand, the fuel cell 1 comprises, for example, a proton-transmitting high polymer film as an electrolyte, and an anode 15 and a cathode 16 provided at opposed sides of the electrolyte film. Multiple single cells each having such structure are connected in series and parallel. The anode 15 and the cathode 16 comprise a diffusion layer and reaction layer individually, and the reaction layer in the anode 15 comprises a porous structure carrying, for example, platinum, a platinum alloy, ruthenium or other catalyst, on a carbon support. The reformer 2 is connected to the anode 15, and an air feed portion 17 such as a pump is connected to the cathode 16, and oxygen for reacting with the hydrogen in the reformate gas is supplied.

To the anode 15 and the cathode 16, moreover, a battery 18 and an inverter 19 are connected as external loads for forming a closed circuit. A current sensor 20 is included in the closed circuit. A motor 21 is connected to the inverter 19. The motor 21 can be a drive source for driving a vehicle or the like.

Ionization of hydrogen occurring in the anode 15 and oxidation reaction through the electrolyte film do not take place in all of the hydrogen gas supplied into the fuel cell 1. However, the reaction efficiency is typically several tens percent, and unreacted flammable gas, that is, hydrogen gas is contained in the emission from the anode 15 side. To use the hydrogen gas effectively, a return pipe 22 communicates with the fuel cell 1 and the combustion portion 6 so as to return the anode 15 side gas into the combustion portion 6. In an intermediate portion of the return pipe 22, a flow rate adjusting valve 23 is provided to control the flow rate of the gas flowing in the return pipe 22. The flow rate adjusting valve 23 controls its opening degree electrically. The return pipe 22 discharges the gas flowing inside properly to the outside without feeding into the combustion portion 6.

Figure 21:
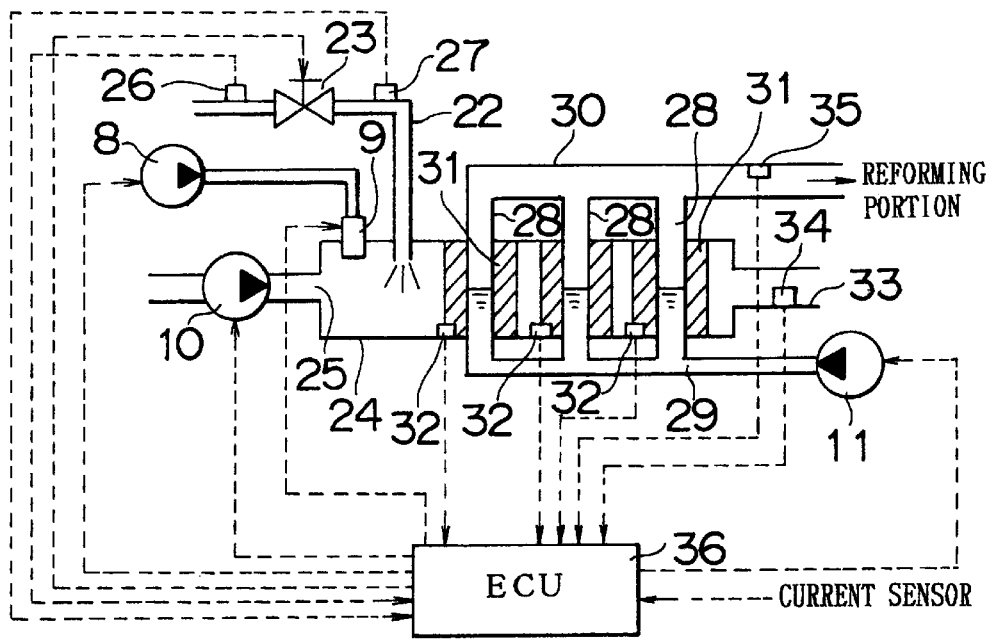
FIG. 21 is a diagram schematically showing an exemplary embodiment of the structure of the heating portion and the control system of the system of FIG. 20.

FIG. 21 shows a further specific constitution of the heating portion 3, together with a control system. The combustion portion 6 includes a combustion chamber 24 for oxidizing the heating fuel while passing methanol as a heating fuel (hereafter referred to as "combustion methanol") and/or unreacted flammable gas and air in a specific direction. The injector 9 is disposed at the inflow side of this combustion chamber 24, so that the combustion methanol is sprayed into the combustion chamber 24 from the injector 9. Moreover, at the inflow side of the combustion chamber 24, an air feed port 25 is formed to open near the spray position of the combustion methanol by the injector 9, and the air pump 10 is connected to this air feed port 25.

Further, near the injector 9 of the combustion chamber 24, the return pipe 22 is opened and connected. At both sides of the flow rate adjusting valve 23 inserted in the return pipe 22, pressure sensors 26, 27 are disposed. The upstream side pressure and downstream side pressure of the flow rate adjusting valve 23 are detected by the pressure sensors 26 and 27, respectively.

The heat exchanger 12 (FIG. 20) is disposed inside of the combustion chamber 24. The heat exchanger 12 includes plural evaporation pipes 28 extending in an airtight state across the combustion chamber 24, and one end of each evaporation pipe 28 communicates with a liquid feed pipe 29, and the other end communicates with a steam pipe 30. At the outer periphery of each evaporation pipe 28, in the area positioned inside of the combustion chamber 24, an oxidizing catalyst 31 is provided. Therefore, the unreacted flammable gas in the emission gas or combustion methanol supplied inside the combustion chamber 24 is oxidized by the oxygen in the air in the catalyst 31, and heat is generated.

To detect the temperature by such combustion, temperature sensors 32 are provided in the catalyst 31 or evaporation pipes 28. These temperature sensors 32 are disposed from the inflow side of the air as combustion aid gas toward the exhaust side.

At the downstream side of the combustion chamber 24, an exhaust pipe 33 is connected, and an air/fuel ratio sensor (A/F sensor) 34 is disposed at the end of the combustion chamber 24 side of this exhaust pipe 33. This A/F sensor 34 issues an electric signal depending on the oxygen concentration in the emission. The A/F sensor 34 detects the ratio (A/F) of the combustion methanol or unreacted flammable gas supplied in the heating portion 3 and the oxygen.

The liquid feed pipe 29 is for supplying the mixture of methanol and water as reformate fuel into the evaporation pipes 28, and is connected to the liquid feed pump 11, forming the reformate fuel feed portion. The steam pipe 30 comprises a duct for feeding the mixed steam of methanol and water produced in the evaporation pipes 28 into the reforming portion 4, and a steam temperature sensor 35 that detects the steam temperature is disposed inside the steam pipe 30.

The pumps 8, 10, 11 are electrically controlled, and are designed to adjust the displacement properly. A controller such as an electronic control unit (ECU) 36 is provided for control purposes. The ECU 36 is typically a microcomputer comprising a central processing unit (CPU), memory devices (RAM, ROM), and input and output interfaces. Detection signals from the sensors 26, 27, 32, 34, 35 are entered as control data. Moreover, to detect the load of the fuel cell 1, a detection signal of the current sensor 20 is entered in the ECU 36. The opening degree of the flow rate adjusting valve 23 is controlled by this electronic control unit 36.

Regarding the basic operation of the reformer 2, a mixture of methanol and water as reformate fuel is supplied into the evaporation pipes 28 through the liquid feed pipe 29 by the liquid feed pump 11. In the combustion chamber 24, combustion methanol is sprayed by the injector 9, and simultaneously or alternatively, emission containing unreacted hydrogen gas is supplied from the return pipe 22. As the combustion support gas, air is supplied by the air pump 10. The heating fuel and air comprising this combustion methanol and/or unreacted hydrogen gas are oxidized in the oxidation catalyst 31, that is, burned to generate heat. By this heat, the evaporation pipes 28 are heated, and the contained mixed liquid is evaporated, such that a mixed steam of methanol and water is generated. The emission caused by combustion is sent out through the exhaust pipe 33.

The mixed steam generated in the evaporation pipes 28 is supplied into the reforming portion 4 through the steam pipe 30. By the catalyst provided in the reforming portion 4, a reforming reaction between methanol and water occurs, and a reformate gas substantially comprising hydrogen gas and carbon dioxide is produced. At the same time, a partial oxidation reaction between the air and methanol supplied into the reforming portion 4 from the air feed portion 13 occurs. This partial oxidation reaction is expressed in the above equation (2), and, as shown, hydrogen gas and carbon dioxide are produced. The reforming reaction of methanol is an endothermic reaction and the partial oxidation reaction of methanol is an exothermic reaction. Therefore, by controlling the reaction so that the endothermic amount and exothermic amount by these two reactions are at least substantially equal to each other, the thermal balance of the reforming portion 4 is achieved, and the temperature of the reforming portion 4 is maintained substantially constant.

Therefore, there is substantially no input or output of heat in the reforming portion 4, and the heat generated in the combustion portion 6 is at least substantially used for heating and evaporation of the reformate fuel.

The gas produced in the reforming portion 4 is, in principle, only hydrogen gas and carbon dioxide. Actually, however, some carbon monoxide (typically about 1%) is generated. The majority of the carbon monoxide reacts with the oxygen in the air supplied from the air feed portion 14 when the reformate gas passes through the CO oxidation portion 5, and becomes carbon dioxide. Thus, the reformate gas enriched in hydrogen is supplied to the anode 15 in the fuel cell 1, which produces hydrogen ions and electrons in its reaction layer, and hydrogen ions pass through the electrolyte film to react with oxygen at the cathode 16 side to produce water. Electrons pass through an external load to produce power.

In this way, the amount of reformate gas produced in the reformer 2 is controlled to the amount corresponding to the load in the fuel cell 1, and therefore the amount of the mixed steam of methanol and water produced in the heating portion 3 is also controlled to the amount corresponding to the load in the fuel cell 1. The control apparatus of the invention controls the combustion in the combustion portion 6 as described below in order to heat and evaporate the reformate fuel depending on the load in the fuel cell 1.

Figure 1:
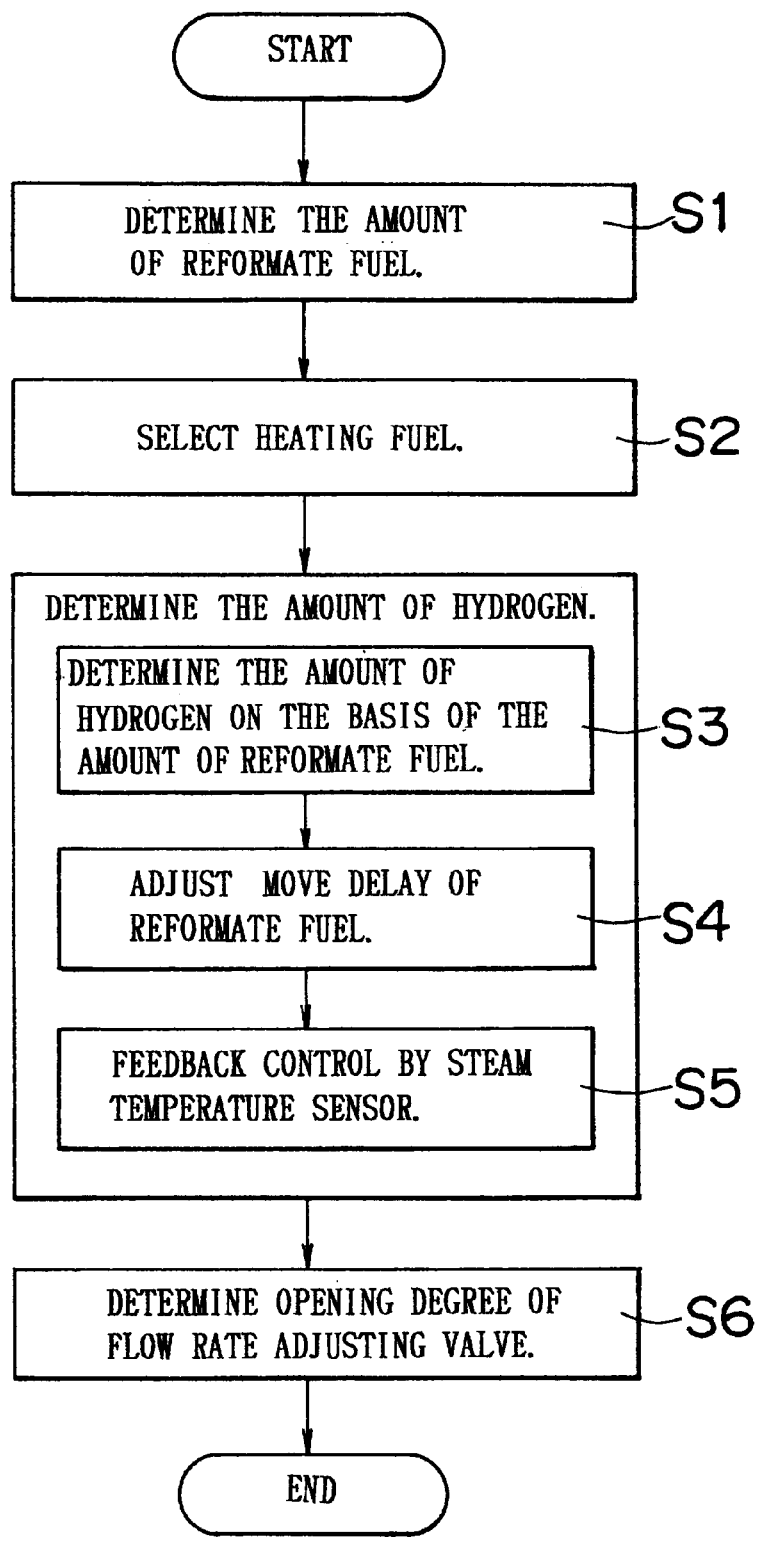
FIG. 1 is a flowchart showing an exemplary embodiment of control executed in a control apparatus of the invention.

FIG. 1 is a flowchart for explaining an exemplary embodiment of this control, in which, first, the amount Fk (mol/s) of reformats fuel (mixed liquid of methanol and water) is calculated (step 1). That is, on the basis of the detected value of the current sensor 20 showing the load of the fuel cell 1, the amount of reformate fuel corresponding to the hydrogen amount required in the fuel cell 1 for this load is determined. In this case, the S/C (steam/carbon) ratio is set, for example, typically at about two.

Next, the heating fuel is selected for heating and evaporating the determined amount of reformate fuel to be reformed. That is, the amount of reformate fuel is the amount to be gasified (step 2). As mentioned above, in the combustion portion 6, combustion methanol and/or unreacted hydrogen gas are supplied to be burned, and therefore either one or both can be used for heating of the reformate fuel. In this case, when the reformate fuel can be heated and evaporated sufficiently by the unreacted hydrogen gas in the emission, only the unreacted hydrogen gas is supplied into the combustion chamber 21 to be used as the fuel for heating the reformate fuel. Therefore, the fuel can be utilized effectively, and the fuel economy may be enhanced.

When the unreacted hydrogen gas in the emission is used as the heating fuel, the amount of hydrogen to be supplied into the combustion portion 6 is determined. First, the necessary hydrogen amount Fho (mol/s) for the reformate fuel amount Fk (mol/s) is determined (step 3). The operation is executed in the following manner.

By heating 1 (mol/s) of reformate fuel to obtain steam, the heat value Hr (kJ/mol) necessary for heating the steam temperature to the target temperature Ter (° C.) at which the activity of the catalyst in the reforming portion 4 is high (that is, the target temperature for generating reformate gas of high quality and high hydrogen gas concentration, for example, 280° C.) is determined as follows:

$$Hr = Hrm + Hrw$$

where Hrm is the heat value necessary for methanol (kJ/mol) and Hrw is the heat value necessary for water (kJ/mol).

These necessary heat values Hrm, Hrw are determined by the following equations:

$$Hrm = 1 \times (Clm \times (Tbm - Ta) + Ebm + Cgm \times (Ter - Tbr))$$

$$Hrw = 2 \times (Clw \times (Tbhm - Ta) + Ebw + Cgm \times (Ter - Tbr))$$

where Clm is the mean specific heat capacity of methanol in the liquid phase (kJ/° C./mol), Clw is the mean specific heat capacity of water in the liquid phase (kJ/° C./mol), Ebm is the evaporation latent heat of methanol (kJ/mol), Ebw is the evaporation latent heat of water (kJ/mol), Cgm is the mean specific heat capacity of methanol in the gas phase (kJ/° C./mol), Cgw is the mean specific heat capacity of steam (kJ/° C./mol), Thm is the boiling point of methanol (° C.), Tbw is the boiling point of water (° C.), and Ta is the ambient temperature (° C.).

On the other hand, to burn hydrogen by using a catalyst in the combustion portion 6, the oxidation reaction at this time is expressed as:

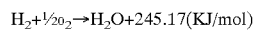

$$H_2 + \tfrac{1}{2}O_2 \rightarrow H_2O + 245.17 (KJ/mol)$$

and considering the necessary heat value Hr to be transmitted to the reformate fuel through the heat exchanger 12, the amount of unreacted hydrogen gas Fho (mol/s) to be supplied as emission is determined by the equation:

$$Fho = Fk \times Hr / 245.17 / \eta$$

where η is the heat exchange efficiency (typically about 0.7) of the heat exchanger 12.

As mentioned above, in step 1, a time delay occurs inevitably from the output of the command signal for supplying the determined amount of reformate fuel into the vaporizing portion 7 until this reformate fuel is evaporated. Such time delay is based on the mechanical structure of the pump 11 and vaporizing portion 7 and the chemical reaction, and in step 4, therefore, the unreacted hydrogen gas amount is adjusted according to the delay. That is, supposing the delay time to be t, Fho (mol/s) is adjusted as follows:

$$Fho(t) = Fho(t - \tau)$$

More specifically, according to the equation:

$$Fho' = Fho(\text{old}) \times \tau / (DT + \tau) + Fho \times DT / (DT + \tau)$$

where DT is the control period, and Fho (old) is the hysteresis of Fho of one control period before.

Moreover, when heating the reformate fuel by the heat generated by the combustion of unreacted hydrogen gas, it may not be achieved as initially expected due to effects of combustion efficiency or heat exchange efficiency. Accordingly, the amount of unreacted hydrogen gas is adjusted according to the steam temperature at the outlet of the vaporizing portion 7 (step 5). An exemplary embodiment of a method of adjustment is described as follows. Assuming that the steam temperature detected by the steam temperature sensor 35 is Te (° C.), the unreacted hydrogen gas amount Fho" is determined in the equation:

$$Fho'' = Fho' + Kp \times (Te - Ter) + Ki \times \Sigma(Te - Ter)$$

where Kp and Ki are control parameters, and Σ(Te−Ter) is the integrated value of the target temperature and detected steam temperature deviation.

In another exemplary embodiment of adjustment, assuming Fho" is given by:

$$Fho'' = Fho' + Fhob$$

the unreacted hydrogen gas amount Fho" can be adjusted. Herein,

If $Te-Ter>\epsilon$, then $Fhob=Fho'+\Delta$

If $Te-Ter<-\epsilon$, then $Fhob=Fho'-\Delta$ where $\epsilon$ and $\Delta$ are control parameters.

The emission amount Fo (mol/s) necessary for feeding the thus calculated amount Fho" of unreacted hydrogen gas into the combustion portion 6 and the opening degree Vo of the flow rate adjusting valve 23 are determined (step 6). First, the hydrogen gas amount Fh (mol/s) sent from the reformer 2 into the fuel cell 1 and the total reformate gas amount Fr (mol/s) are determined according to the respective equations:

$$Fh=Kh\times Fk$$

$$Fr=Kr\times Fr$$

where Fk is the reformate fuel amount determined at step 1 (mol/s), Kh is the hydrogen gas generating molar ratio to methanol (constant), and Kr is the reformate gas generating molar ratio to methanol (constant).

Next determined is the ratio Rh of the hydrogen gas in the emission sent from the fuel cell 1 to the return pipe 22. According to the equation:

$$Rh=(Fh-Ifc/(2\times Kf))/(Fr-Ifc/(2\times Kf))$$

where Ifc is the current value or the load of the fuel cell 1 detected by the current sensor 20, and Kf is the Faraday's constant.

From the determined rate Rh of the unreacted hydrogen gas in the emission and the necessary hydrogen gas amount Fho", the necessary emission amount Fo (mol/s) is determined using the equation:

$$Fo=Fho"/Rh$$

In order to feed this determined emission gas flow rate Fo (mol/s) into the combustion chamber 24, the required opening degree Vo of the flow rate adjusting valve 23 is given by:

$$Vo=Fo/(c\times(Po-Pb)^{1/2})$$

where c is the valve throttle coefficient, Po is the pressure detected by the pressure sensor 26 at the upstream side of the flow rate adjusting valve 23 (that is, at the anode 15 side), and Pb is the pressure detected by the pressure sensor 27 at the downstream side of the flow rate adjusting valve 23 (that is, at the combustion portion 6 side). When fluctuations of these pressures Po, Pb are small, predetermined constants can be used as estimates instead of the pressures actually detected by the sensors. In this case, the pressure sensors 26 and 27 are not necessary. The opening degree Vo of the flow rate adjusting valve 23 is controlled to the above value, and the unreacted hydrogen gas necessary for heating the reformate fuel to a steam of desired temperature is supplied into the combustion portion 6.

Therefore, according to embodiments of the apparatus of the invention for controlling the feed amount of the unreacted hydrogen gas into the combustion portion 6, the reformate fuel depending on the load of the fuel cell 1 can be heated and evaporated, and a reformate fuel steam of a desired temperature can be obtained. As a result, the activity of the catalyst in the reforming portion 4 is maintained, and reformate gas of high quality can be produced at least substantially without producing carbon monoxide or residual methanol. Accordingly, poisoning of the catalyst and lowering of its durability is prevented. Moreover, the unreacted hydrogen gas inevitably occurring in the anode 15 of the fuel cell 1 (that is, flammable gas) can be utilized effectively, and the fuel economy is enhanced. In particular, by executing this control, the unreacted hydrogen gas is not consumed more than necessary, and hence the enhancing effect of fuel economy is excellent.

Figure 2:
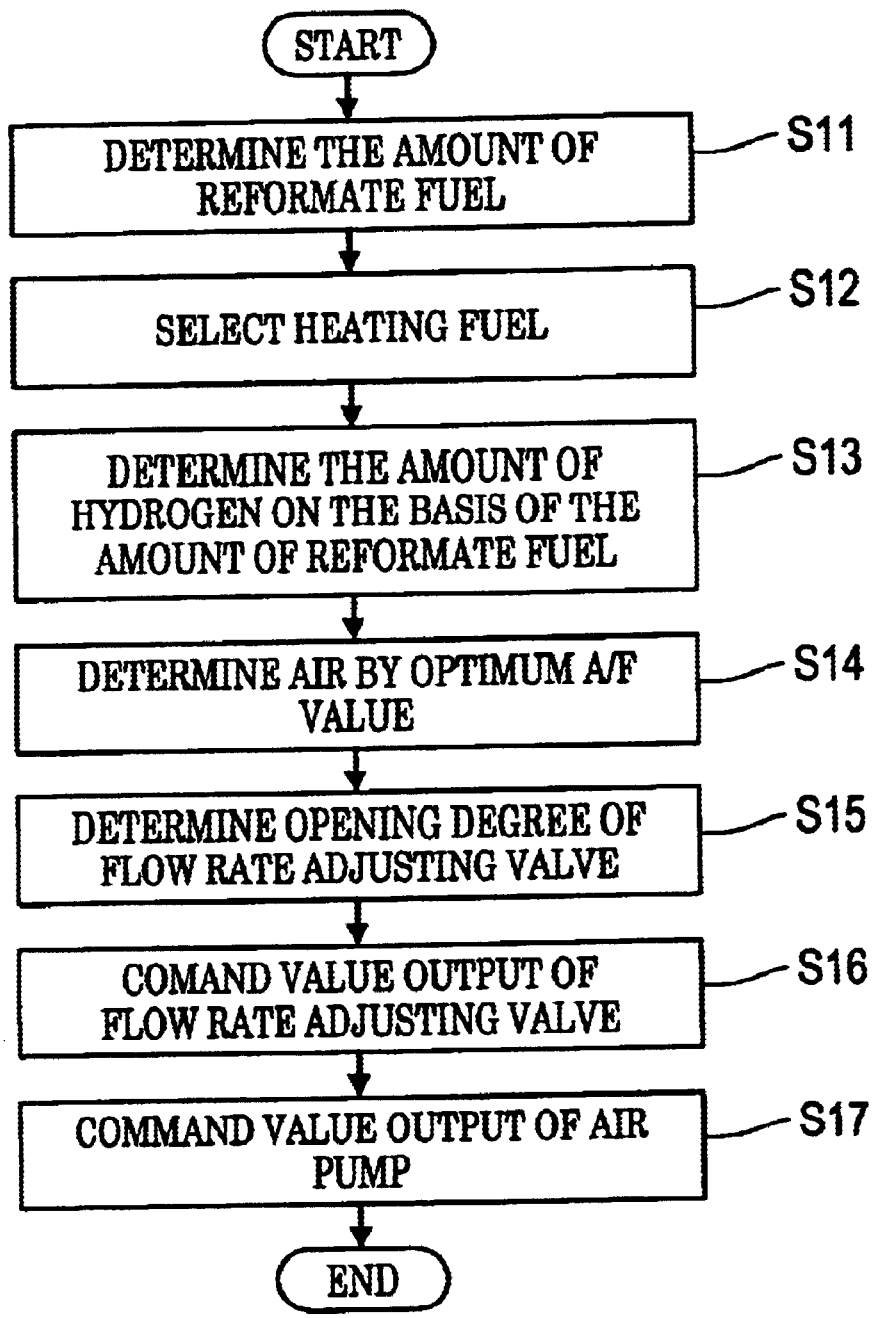
FIG. 2 is a flowchart showing another exemplary embodiment of control executed in a control apparatus of the invention.

The heat generation temperature varies depending on the amount of air supplied into the combustion chamber 24 in relation to the amount of unreacted hydrogen gas, and therefore the air flow is controlled together with the control of the unreacted hydrogen gas amount. An exemplary embodiment of this control is shown in FIG. 2. In the control example shown in FIG. 2, first, the amount of the reformate fuel is determined (step 11). This is the same as the control in step 1 in FIG. 1, and therefore the value calculated in step 1 in FIG. 1 may be utilized in the control of FIG. 2. Next, the type of heating fuel to be supplied into the combustion portion 6 is selected (step 12). That is, as the fuel to be burned in the combustion portion 6, combustion methanol and/or unreacted hydrogen gas is selected. This is the same step as the control in step 2 in FIG. 1, and therefore the control in step 2 in FIG. 1 may be directly utilized in this control. Further heating the required amount of reformate fuel, the hydrogen gas amount necessary for obtaining steam at a desired temperature is determined (step 13). This is the same as the control in step 3 in FIG. 1, and therefore the determined result in step 3 in FIG. 1 may be directly utilized in this control. Because the amount of hydrogen gas supplied into the combustion portion 6 is adjusted, the hydrogen gas amount determined in step 3 and adjusted in steps 4 and 5 may be utilized. In the following explanation, however, an example of utilizing the hydrogen gas amount determined in step 3 is described.

On the basis of the hydrogen gas amount calculated in this step 13 and the optimum A/F (air/fuel) value, the air amount Fa as combustion aid gas is calculated (step 14). For complete oxidation of 1 mole of hydrogen, ½ mole of oxygen is needed, and the proportion of oxygen in air is about ⅕. Herein, the gas not presented for oxidation of hydrogen takes away the heat generated by combustion to the outside, and therefore an appropriate A/F value ($=\lambda r$) is experimentally determined in advance on the basis of the steam temperature or the temperature of the combustion portion 6. Therefore, the air amount Fa necessary for combustion of hydrogen gas in the amount Fho calculated in step 13 is determined as follows:

$$Fa=\lambda r\times Fho$$

In step 15, it is intended to determine the emission amount for feeding the necessary amount of unreacted hydrogen gas for heating the reformate fuel to obtain steam at a desired temperature into the combustion portion 6, and the opening degree of the flow rate adjusting valve 23 for obtaining such an emission amount. The control procedure is the same as for step 6 in the control in FIG. 1, and the calculated result at step 6 can be directly utilized in this control. In order to obtain such opening degree, a command signal is issued to the flow rate adjusting valve 23 (step 16). Also, a command value of the air pump 10 is issued to achieve the air value determined at step 14 (step 17).

Therefore, according to embodiments of the control apparatus of the invention for controlling as shown in FIG. 2, the amount of the air conforming to the required reformate fuel amount can be supplied into the combustion portion 6, and the temperature of the reformate fuel can be set to a temperature suited to the reforming reaction at the reforming portion 4. As a result, as for the control in FIG. 1, the reforming reaction of the reformate fuel can be promoted favorably, and a reformate gas of high quality is obtained. It is also possible to avoid poisoning or deterioration of the anode 15 or lowering of output of the fuel cell 1.

In the example of control shown in FIG. 2, the air amount is determined on the basis of the demanded unreacted hydrogen gas amount or its adjusted value and optimum A/F value, and the determined amount of air is supplied. In actual operation, however, the expected reaction or heat generation may not always occur due to various factors, and the steam temperature may deviate. Therefore, as for the control example shown in FIG. 1, the air amount may be adjusted. An example of such adjustment is explained in the following exemplary embodiment.

For use in the heating of reformate fuel, in order to enhance the fuel economy, the emission produced at the anode 15 side of the fuel cell 1 is mixed with unreacted hydrogen gas at a specified rate. In this case, on the basis of the reformate fuel amount, the valve opening degree to determine the flow rate of the emission to the combustion portion 6 can be controlled. That is, the opening degree of the flow rate adjusting valve 23 is determined on the basis of the reformate fuel amount corresponding to the load of the fuel cell 1. In this case, the amount of air supplied into the combustion portion 6 is controlled as follows.

Figure 3:
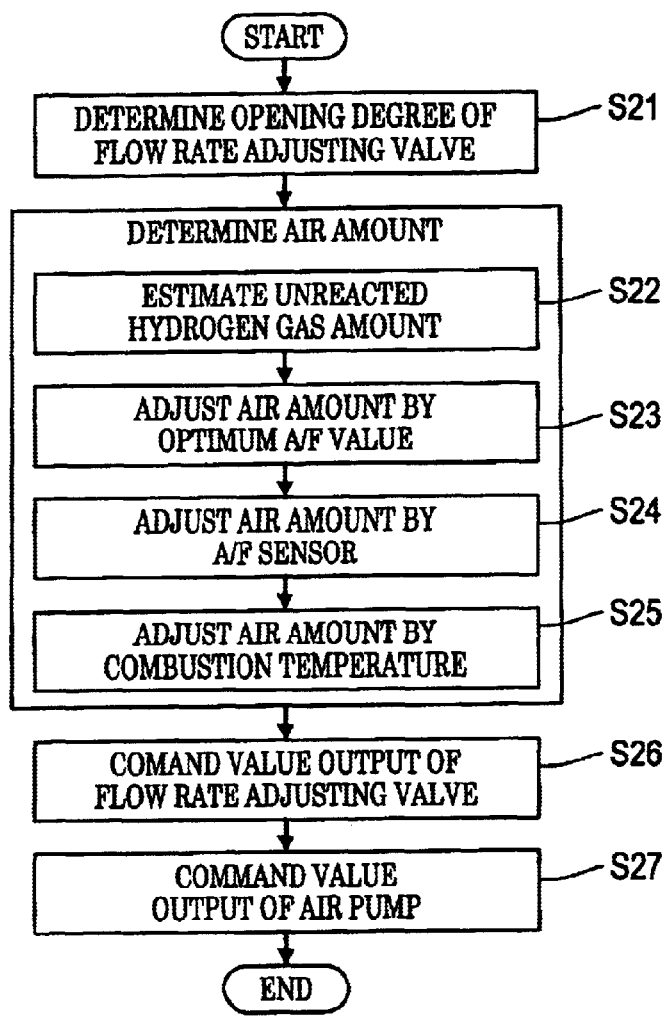
FIG. 3 is a flowchart showing another exemplary embodiment of control executed in a control apparatus of the invention.

FIG. 3 shows an exemplary embodiment of control. First, the opening degree of the flow rate adjusting valve 23 of the emission is determined (step 21). From the heat value necessary for heating the reformate fuel in the amount calculated depending on the load of the fuel cell 1 to obtain steam at desired temperature, the amount of the unreacted hydrogen gas is determined, and the amount of emission containing it by a specified content is determined. Hence, the opening degree of the flow rate adjusting valve 23 is calculated so as to obtain this emission amount. In this control, the control gain can be determined in advance, and the flow rate adjusting valve can be immediately determined on the basis of the control gain according to the reformate fuel amount.

Next, the amount of air as combustion aid gas is determined. First, the hydrogen gas amount Fh (mol/s) to be sent into the fuel cell 1 and the total amount of reformate gas (mol/s) are estimated as follows:

$$Fh = Kh \times Fk$$

$$Fr = Kr \times Fk$$

This is the same as the determination made at step 6 in FIG. 1. The reforming reaction using methanol is given by:

$$CH_3OH + H_2O \rightarrow 3H_2 + CO_2$$

hence Kh=3 and Kr=4.

Next, the rate Rh of hydrogen gas in the emission sent from the fuel cell 1 into the return pipe 22 is determined by:

$$Rh = (Fh - Ifc/(2 \times Kf))/(F - Ifc/(2 \times kf))$$

This is same as the determination made in the process of determining the opening degree of the flow rate adjusting valve 23 in the control shown in FIG. 1.

On the other hand, the total amount Fo (volume flow rate) of emission supplied into the combustion portion 6 through the flow rate adjusting valve 23 is determined as follows:

$$Fo = Vo \times c \times (P_o - P_b)^{1/2}$$

where Vo is the opening degree of the flow rate adjusting valve 23, c is the valve throttle coefficient, $P_o$ is the pressure detected by the pressure sensor 26 at the upstream side of the flow rate adjusting valve 23, that is, at the anode 15 side, and $P_b$ is the pressure detected by the pressure sensor 27 at the downstream side of the flow rate adjusting valve 23, that is, at the combustion portion 6 side. When fluctuations of these pressures $P_o$ and $P_b$ are small, predetermined constants can be used as estimated values instead of the pressures actually detected by the sensors. In this case, the pressure sensors 26, 27 are not required.

On the basis of the thus calculated emission amount Fo and hydrogen gas rate Rh, the hydrogen gas amount Fho to be supplied into the combustion portion 6 is determined as follows:

$$Fho = Fo \times Rh$$

For more accurate control, on the basis of the time delay from the supply of reformate fuel until the start of reaction, the unreacted hydrogen gas amount is adjusted. Assuming that the reaction delay is expressed by a primary delay system, the delay characteristic Gr(s) is given by:

$$Gr(s) = 1/(1 + Tr \times s) \times exp(-Lr \times s)$$

where Tr is the primary delay constant, Lr is the reforming portion gas transport delay time, and s is a Laplacian operator.

The gas transport delay characteristic Gf(s) in the fuel cell 1 is determine by:

$$Gf(s) = exp(-Lr \times s)$$

where Lf is the gas transport delay time in the fuel cell 1. On the basis of these delay characteristics Gr(s), Gf(s), the hydrogen gas amount Fho is adjusted according to the following equation:

$$Fho' = Fho \times Gr(s) \times Gf(s)$$

In the above description, each delay characteristic is described in the form of a Laplace transform, but the actual determination in the ECU 36 is executed by transforming into a discrete type.

On the basis of the thus determined estimated hydrogen gas amount Fho', the air amount Fa is determined (step 23). For complete oxidation of 1 mole of hydrogen, ½ mole of oxygen is required, and the proportion of oxygen in air is about ⅕. The gas that is not subjected to oxidation of hydrogen can take away the heat generated by combustion to the outside, and therefore an appropriate A/F (air/fuel) value (=λr) can be experimentally determined in advance on the basis of the steam temperature or temperature of the combustion portion 6. Therefore, the air amount Fa required for combustion of hydrogen gas in the amount Fho' estimated in step 22 is determined as follows:

$$Fa = \lambda r \times Fho'$$

Because the actually supplied air amount may deviate from the target value, the air amount is adjusted on the basis of the oxygen concentration No in the emission exhausted from the combustion chamber 24 (step 24). That is, by the A/F sensor 34 disposed in the exhaust pipe 33 provided at the downstream side of the combustion chamber 24, the oxygen concentration No in the gas exhausted from the combustion chamber 24 is detected. On the other hand, in the case of complete reaction for the supplied air amount Fa, the target oxygen concentration Nor in the emission is determined, and the supplied air amount is adjusted so that the detected oxygen concentration No coincides with the target oxygen concentration Nor. It is the same meaning as the ratio of the unreacted hydrogen gas supplied in the combustion chamber 24 and the oxygen is detected and the supplied air amount is adjusted accordingly. As an example of adjustment, using the equation:

$$Fa'=Fa+Kp1\times(No-Nor)+Ki1\times\Sigma(No-Nor)$$

the adjusted air amount Fa' is determined. Herein, Kp1 and Ki1 are control parameters, and $\Sigma(No-Nor)$ is the integrated value of the deviation of the measured oxygen concentration and target oxygen concentration.

In other example of adjustment, according to the equation:

$$Fa'=Fa+Fb$$

the air amount Fa' is adjusted. Herein,

If $No-Nor>\epsilon 1$, then $$Fb=Fb+\Delta 1$$

where $\epsilon 1$ and $\Delta 1$ are control parameters.

This air amount may be further adjusted on the basis of the transport and reaction delay of the reformate fuel. In this case, the air amount adjusted on the basis of the response delay of the reformate fuel may be further adjusted according to the detected value of the A/F sensor 34.

Figure 4:
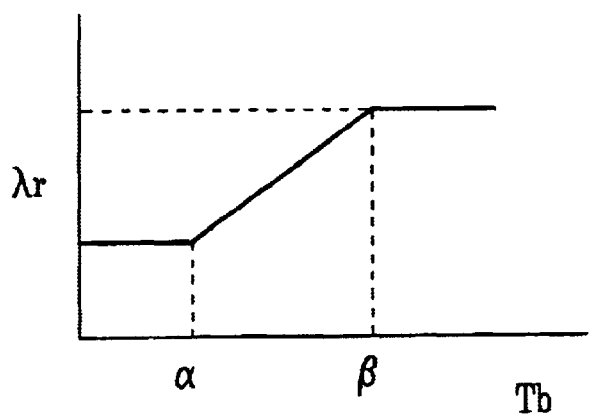
FIG. 4 is a diagram showing an example of a map for determining the A/F ratio on the basis of the detected temperature of the combustion portion of the reformer.

Moreover, the degree of promotion of combustion of unreacted hydrogen gas differs with the temperature at the combustion portion 6, and therefore in order to maintain a suitable temperature at the combustion portion 6, the air amount is adjusted according to the detected temperature (step 25). As mentioned above, the heat generation temperature of each oxidation catalyst 31 in the combustion portion 6 is detected by the temperature sensors 32, and the average temperature or the maximum temperature of the temperatures detected by the temperature sensors 32 is used as a representative temperature Th of the detected temperatures. Depending on the representative temperature Th, the target A/F value ($\lambda$r) is varied. The target A/F value $\lambda$r may be determined either by calculation or by using a map. An example of such a map is shown in FIG. 4.

That is, if the detected representative value Th exceeds a predetermined specified temperature $\alpha°$ C., the target A/F value Ir value is set to a larger value depending on the temperature. When exceeding other specified temperature b, the target A/F value $\lambda$r is maintained at a specified upper limit value. That is, within a specified temperature range, the higher is the detected temperature of the combustion portion 6, the greater is the air amount to keep the combustion fuel in a so-called lean state, and to the contrary the lower is the detected temperature of the combustion portion 6, the less is the air amount to set relatively in a so-called rich state. As a result, if the temperature tends to be excessively high, the combustion amount of the unreacted hydrogen gas is suppressed, such that the heat taken away by the exhaust increases, and the temperature rise in the combustion portion 6 is suppressed. On the contrary, when the temperature tends to decline, the combustion amount of the unreacted hydrogen gas increases, such that the heat taken away by the exhaust decreases, and the temperature becomes higher.

Consequently, to adjust to the opening degree of the flow rate adjusting valve 23 determined in step 21, a command signal is issued from the ECU 36 to the flow rate adjusting valve 23 (step 26). To adjust the air amount corresponding to the combustion portion 6 to the above amount, a command signal is issued from the ECU 36 to the air pump 10 (step 27). These steps 26 and 27 are the same as the control in steps 16 and 17 in FIG. 2.

Therefore, according to the control apparatus of the invention for executing the exemplary embodiment of control shown in FIG. 3, when heating the reformate fuel by supplying unreacted hydrogen gas into the combustion portion 6, the unreacted hydrogen gas amount can be set to an amount suited to the reformate fuel amount. At the same time, depending on the amount of the unreacted hydrogen and adjusted depending on the actual heating temperature or the like, a proper amount of air is supplied into the combustion portion 6. Thus, the unreacted hydrogen gas can be utilized effectively, and the temperature of the reformate fuel can be maintained at a temperature suited to the reforming reaction. As a result, the reforming reaction proceeds favorably, and the reformate gas of high quality is produced, power generation efficiency of the fuel cell 1 is enhanced and poisoning and deterioration of the catalyst can be prevented at the same time.

Figure 5:
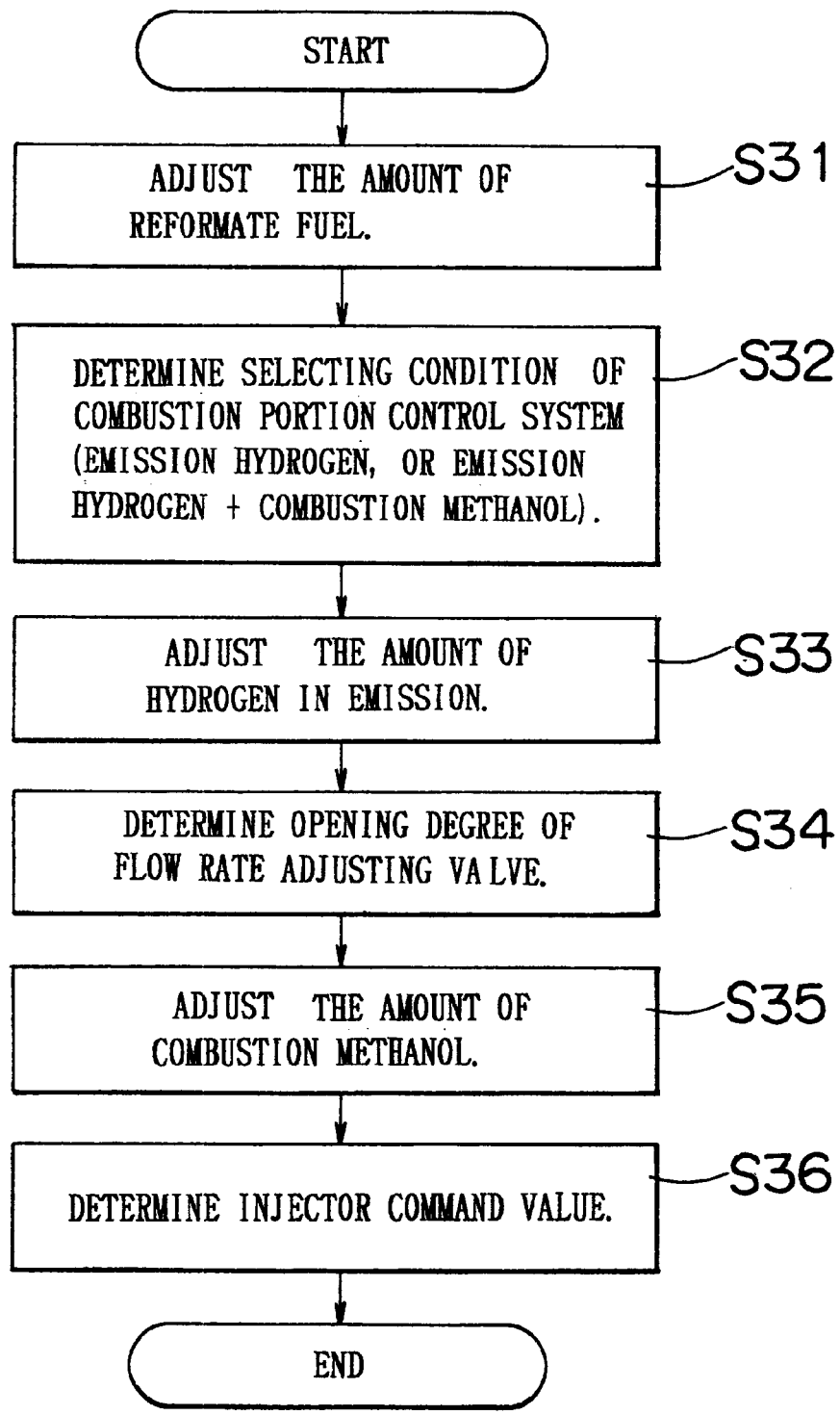
FIG. 5 is a flowchart showing another exemplary embodiment of control executed in a control apparatus of the invention.

FIG. 5 is a flowchart showing another exemplary embodiment of control. As shown, first, the amount of the reformate fuel (mixture of methanol and water) is determined (step 31). The hydrogen gas used in the fuel cell 1 is produced by the reaction shown in equations (1) and (2), and therefore it can be determined based on the reforming rate, the utility rate of hydrogen gas in the fuel cell 1, or the Faraday's constant.

The selecting condition of the combustion material to be supplied into the combustion portion 6 is determined (step 32). More specifically, when the logical multiplication (AND) of 3 conditions is established, that is, (A) the opening degree Vo (%) of the flow rate adjusting valve 23 is higher than the predetermined maximum value Vou, (B) the steam temperature Te (° C.) of the reformats fuel is lower than the predetermined minimum limit temperature Tel, and (C) the control flag Fac is OFF, the combustion methanol as heating fuel is additionally supplied. In other words, when these three conditions are established, although the unreacted flammable gas (hydrogen in the emission) is supplied to the combustion portion 6 to the maximum extent, the reformate fuel temperature is lower than the lower limit value, and the heat generation at the combustion portion 6 is insufficient. Accordingly, in addition to the unreacted flammable gas, combustion methanol is additionally supplied into the combustion portion 6 such that the heat generation capacity is increased. That is, so-called assist control is executed using the combustion methanol. At the same time, the control flag Fac is turned ON.

Meanwhile, when the logical multiplication (AND) of three conditions is established, that is, (i) the command value $\tau(\%)$ to the injector 9 for controlling the combustion methanol amount is equal to or lower than 0%, (ii) the reformate fuel steam temperature Te (° C.) is higher than the upper limit temperature Teu, and (iii) the control flag Fac is ON, the assist control is terminated. That is, in a state where these three conditions are established, in spite of stopping the supply of combustion methanol, the heat generation in the combustion portion 6 is still higher than the heat required for heating the reformate fuel. Therefore, the assist control of supplying the combustion methanol to the combustion portion in addition to the unreacted flammable gas (hydrogen in the emission) is stopped. At the same time, the control flag Fac is turned OFF.

Figure 6:
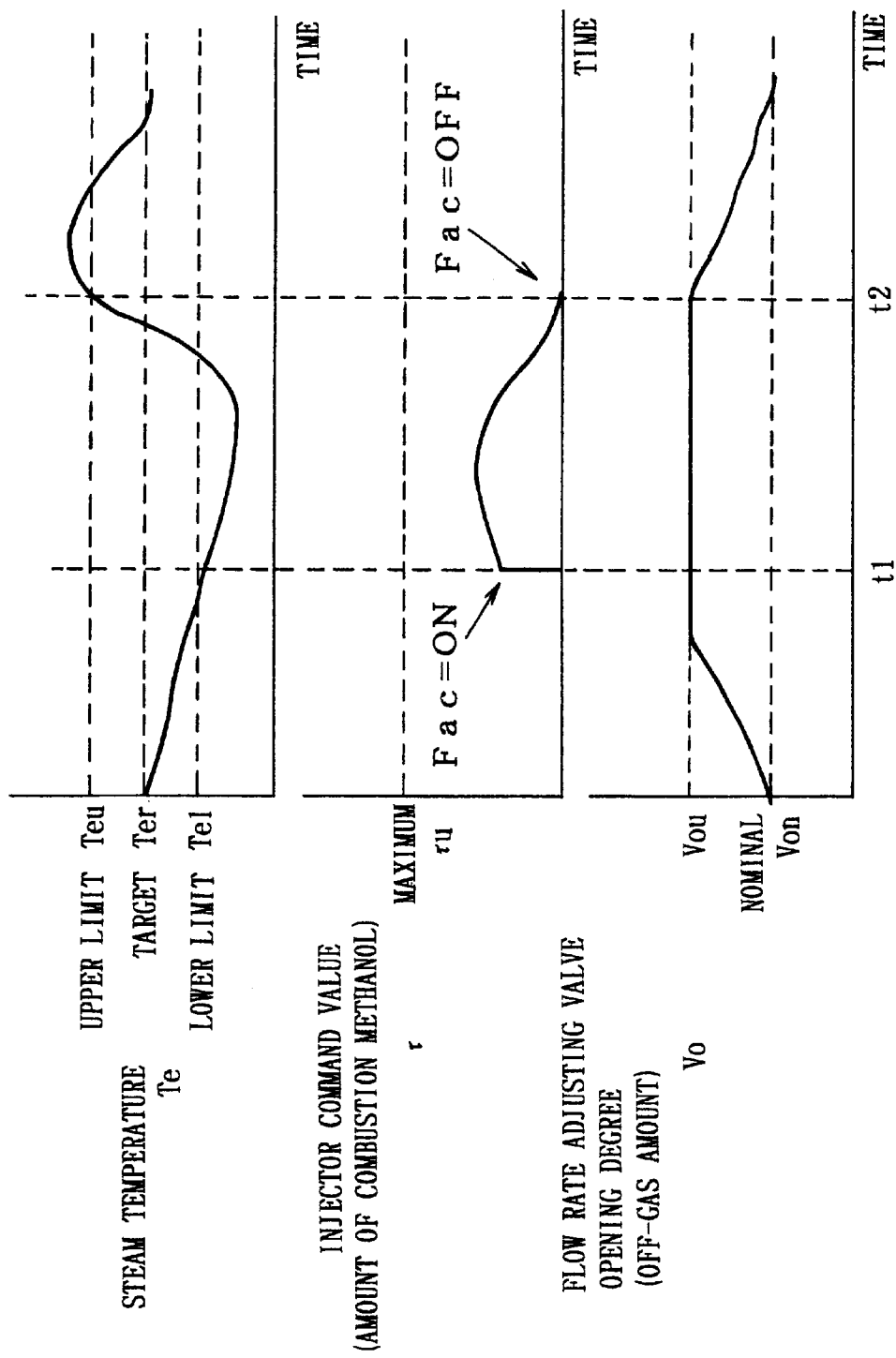
FIG. 6 is a time chart showing changes of control values when the control shown in FIG. 5 is executed.

FIG. 6 shows the time chart in the case where the selecting condition of the combustion material to the combustion portion 6 is determined and the reformate fuel is heated. That is, with the opening degree Vo of the flow rate adjusting valve 23 set at the maximum value Vou, when the steam temperature (reformate fuel temperature) Te becomes lower than the lower limit value Tel (time t1), because the heat generation in the combustion portion 6 is insufficient, supply of combustion methanol is started. That is, the injector command value τ is set at a specified value, and the control flag Fac is turned ON.

As a result, in the combustion portion 6, combustion of unreacted flammable gas (hydrogen in the emission) and combustion methanol occurs, and as the material fuel is increased, the heat generation capacity in the combustion portion 6 increases. In this case, depending on the steam temperature, the injector command value τ, that is, the combustion methanol amount is controlled.

When the steam temperature gradually increases by an increase of heat generation in the combustion portion 6, or a decrease of the amount of the reformate fuel, the injector command value τ (combustion methanol amount) is lowered accordingly, and at time t2 when the reformate fuel steam temperature reaches the upper limit temperature Teu, the injector command value τ drops to 0%. In this state, when the reformate fuel steam temperature is higher than the upper limit temperature Teu, supply of combustion methanol, that is, assist control, is terminated, and the control flag Fac is turned OFF.

Later, in order to set the reformate fuel steam temperature Te to the target temperature, the opening degree of the flow rate adjusting valve 23 for emission is decreased depending on the temperature Te, and the reformate fuel is heated only by the unreacted flammable gas.

Because there is a response delay from the change of heat generation in the combustion portion 6 until the actual change of temperature of the reformate fuel, it is preferable to set a specified temperature difference (for example, 30° C.) between the upper limit temperature Teu and the lower limit temperature Tel, in order to prevent hunting in control due to a supply or stop of combustion methanol and a change of emission amount.

Thus, basically, the reformate fuel is heated by burning the unreacted flammable gas. Accordingly, the amount of unreacted flammable gas or hydrogen in emissions that can be consumed in the combustion portion 6 is determined (step 33). It is determined, for example, from the amount of hydrogen gas supplied into the fuel cell 1 and the consumption of hydrogen gas assessed on the basis of the electric power supplied to the outside.

In the case of combustion of unreacted flammable gas (hydrogen gas), the heat generation per unit amount is known, and by considering the efficiency when heating the reformate fuel by this heat, the amount of emission necessary for heating the reformate fuel is known. In step 34, hence, the opening degree of the flow rate adjusting valve 23 is determined. When the assist control is executed, that is, when the control flag Fac is turned ON, the opening degree of the flow rate adjusting valve 23 is fixed at the upper limit value Vou. By contrast, when the assist control is not executed, that is, the control flag Fac is turned OFF, the opening degree is determined on the basis of the amount of emission required for heating the reformate fuel. The opening degree is, for example, determined on the basis of the emission amount containing the required amount of unreacted flammable gas, valve throttle coefficient, and the pressure difference between the upstream side and downstream side of the flow rate adjusting valve 23.

On the other hand, if it is impossible to heat the reformate fuel sufficiently by the unreacted flammable gas alone, combustion methanol is additionally supplied into the combustion portion 6 to burn, and the amount of this combustion methanol is calculated (step 35). Because the heat generation by oxidation of combustion methanol is known, the combustion methanol amount can be determined on the basis of the specific heat or evaporation latent heat of the reformate fuel, amount of reformate fuel, heat transfer rate to the reformate fuel, target temperature of reformate fuel, and adjustment amount due to control delay. This combustion methanol amount is determined by the feedback control on the basis of the reformate fuel steam temperature.

A command signal is sent to the injector 9 so that the thus determined amount of combustion methanol can be supplied into the combustion portion 6 (step 36). In this case, the pump 8 is controlled so that the upstream side temperature of the injector 9 can be a substantially constant pressure (for example, about 2 atm). This is intended to keep a constant relation between the command value to the injector 9 and the displacement, and therefore the amount of combustion methanol supplied by the injector 9 becomes accurate.

Such feedback control of the combustion methanol amount is limited only when the control flag Fac is turned ON, that is, the assist control by combustion methanol is executed, and otherwise when the control flag Fac is turned OFF and the assist control is not executed, the command value to the injector 9 is fixed at 0%.

According to embodiment of the control apparatus of the invention for controlling as described above, the reformate fuel is heated by using the unreacted flammable gas produced inevitably from the energy converter for using the reformate fuel such as fuel cell 1 and producing energy in a different form, and only when the heating calorific value is insufficient, heating fuel such as methanol is added to burn. Therefore, the fuel is utilized effectively, enhancing the thermal efficiency. At the same time, because the temperature of the reformate fuel can be maintained at a target temperature, a steam reforming reaction or partial oxidation reforming reaction can be promoted to obtain a reformate gas of high quality, so that poisoning by carbon monoxide in the fuel cell 1 can be decreased.

In this example, an excess or deficiency of heat, and the necessity of additional combustion are judged on the basis of the reformate fuel steam temperature. However, the heat value required for heating the reformate fuel and the heat value obtained by burning the unreacted flammable gas can be both assessed on the basis of the running conditions of the reformer 2, and therefore an excess or deficiency of heating calories and the necessity of additional combustion can be determined from the running conditions of the reformer 2 without referring to the reformate fuel steam temperature. Therefore, the step 32 can be replaced by the step of selecting the combustion material on the basis of the assessment of such heat values and comparison of the results of assessment.

In the case of combustion by supplying unreacted flammable gas or combustion methanol into the combustion portion 6, the combustion reaction, heat transfer to the reformate fuel, or release of heat to the outside is not uniform at all positions, and temperature variations inevitably occur. If a high temperature occurs locally due to such temperature variations, high-heat damage can occur in such location, which can be prevented by the control described below.

Figure 7:
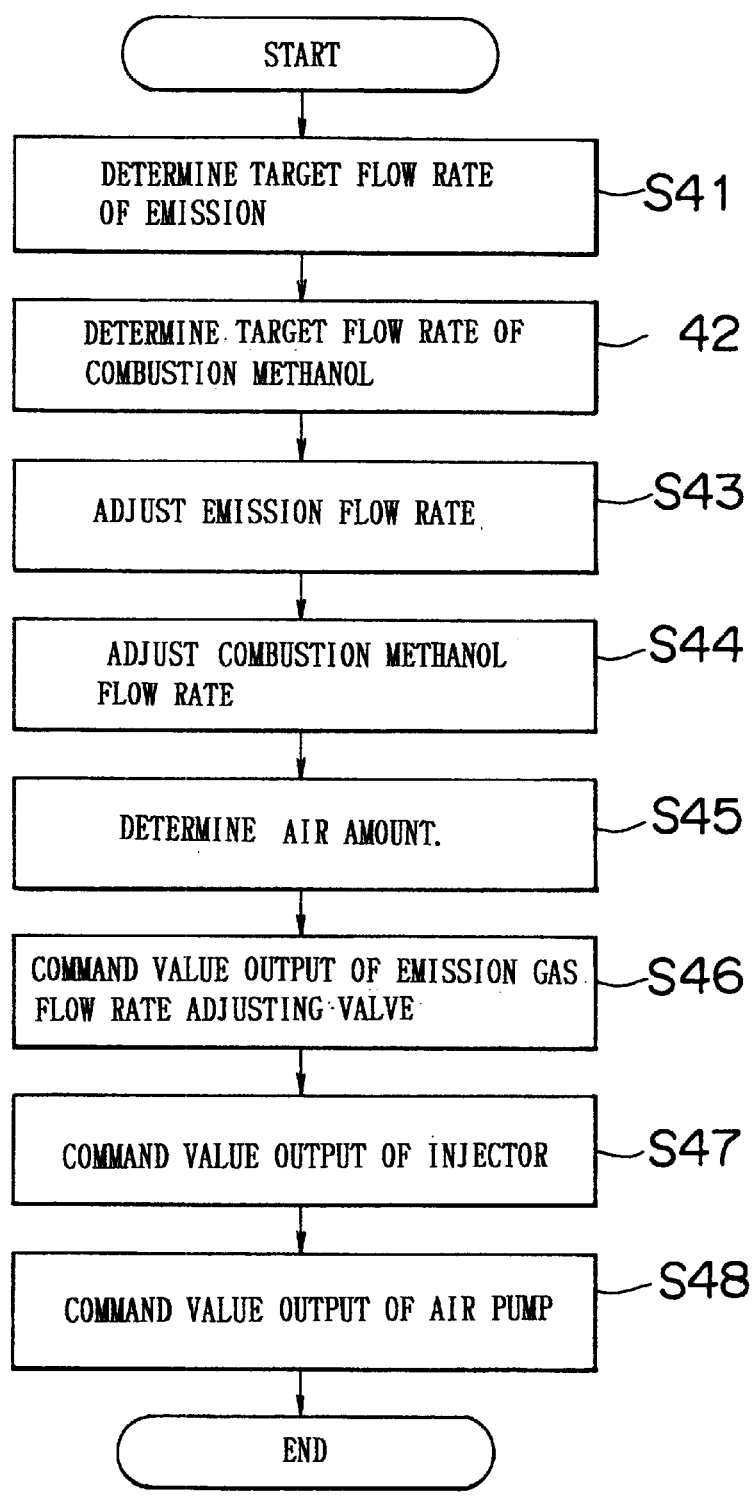
FIG. 7 is a flowchart showing another exemplary embodiment of control executed in a control apparatus of the invention.

FIG. 7 is a flowchart showing an example, in which, first, the emission target flow rate and combustion methanol target flow rate are determined in steps 41 and 42. This is executed according to the control shown in FIG. 5, and when the assist control has been executed, the emission flow rate is fixed at the value of setting the opening degree of the flow rate adjusting valve 23 at the upper limit value Vou, or if the assist control has not been executed, it is determined on the basis of the target temperature of the reformate fuel and its amount. In the case where the assist control has been executed, the flow rate of the combustion methanol is determined on the basis of the temperature of the reformate fuel or the shortage of heat required for heating the reformate fuel to the target temperature.

Consequently, depending on whether the assist control has been executed or not, the emission flow rate and/or combustion methanol flow rate is adjusted (steps 43 and 44). More specifically, if the assist control has not been executed, the emission flow rate is adjusted, and if the assist control has been executed, the flow rate of combustion methanol is adjusted.

These flow rate adjustments are performed on the basis of the temperature of the combustion portion 6. That is, by the temperature sensors 32, the temperatures Tb1, Tb2, ..., Tbn of parts of the combustion portion 6 are detected, and the representative temperature Tbm is determined from the detected temperatures Tb1, Tb2, ..., Tbn. This representative temperature Tbm can be the temperature at the position most likely to in the combustion portion 6, or the maximum value of the detected temperatures Tb1, Tb2, ..., Tbn. By setting the adjustment coefficients Ko, Km depending on the representative temperature Tbm, each flow rate is adjusted by multiplying the flow rates Qo, Qm assessed in step 41 or 42 by the adjustment coefficient. That is, the emission flow rate is adjusted as:

$$Qo' = Ko \times Qo,$$

and the flow rate of combustion methanol is adjusted as:

$$Qm' = Km \times Qm.$$

Figure 8A:
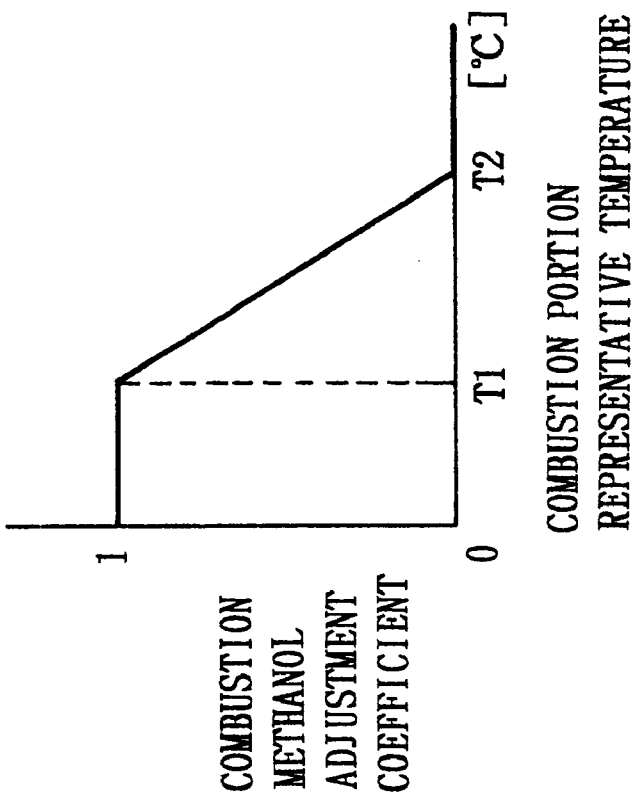
FIG. 8A is a map showing an emission adjustment coefficient versus combustion portion representative temperature.
Figure 8B:
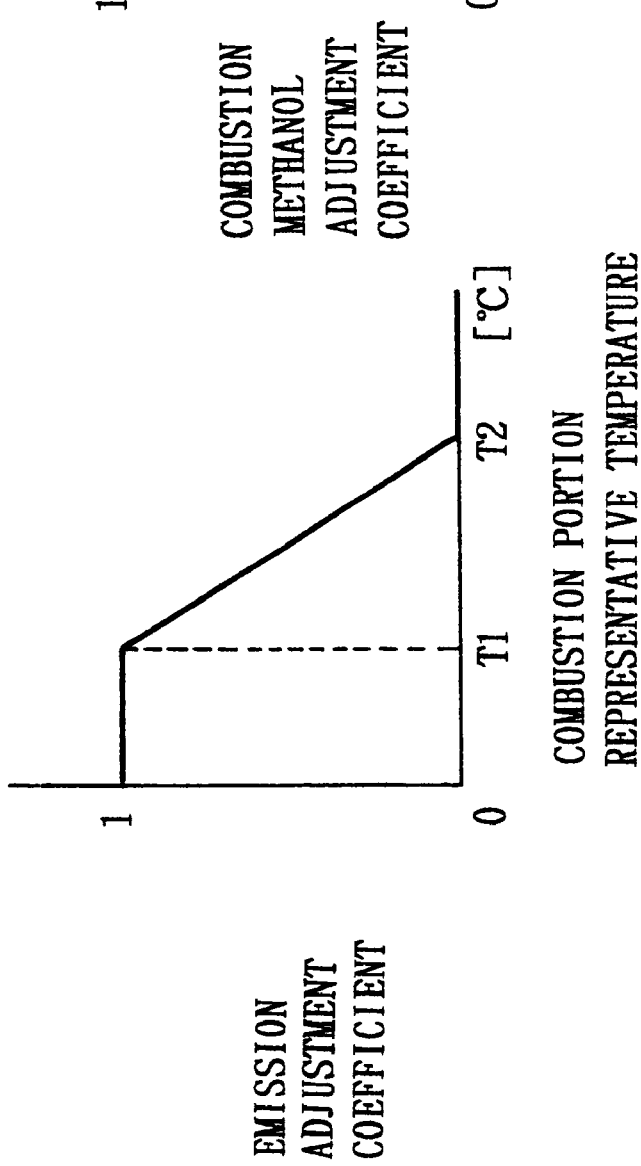
FIG. 8B is a map showing a combustion methanol adjustment coefficient versus combustion portion representative temperature.

As the adjustment coefficients Ko, Km, the values preliminarily set in the form of map can be used, and more specifically the values shown in FIG. 8A and FIG. 8B can be used. That is, when the representative temperature Tbm is lower than the first reference temperature T1 lower by specified temperature than the allowable upper limit temperature of the combustion portion 6, the adjustment coefficients Ko, Km are "1". And, in a range higher than the first reference temperature T1 and to the second reference temperature T2 lower than the allowable upper limit temperature, the adjustment coefficients Ko, Km decreases from "1" to "0" depending on the increase of the representative temperature Tbm. The adjustment coefficients Ko and Km are set at "0" at temperature higher than the second reference temperature T2.

The air amounts corresponding to the emission amount containing the unreacted flammable gas and combustion methanol amount thus determined are assessed (step 45). The oxygen amount required for completely burning the unreacted flammable gas and combustion methanol can be known by the formula of the oxidation reaction. Because the oxygen concentration in the air is known and the temperature in the oxidation reaction can be assumed preliminarily, the required air amount, or the air/fuel ratio (A/F) can be determined from the unreacted flammable gas amount and combustion methanol amount.

In this manner, the emission flow rate, combustion methanol flow rate, and air amount are determined, and corresponding command values can be issued. That is, an opening degree command signal for obtaining the emission flow rate is issued to the flow rate adjusting valve 23 disposed in the return pipe 22 (step 46), a command signal for obtaining the combustion methanol amount is issued to the injector 9 (step 47), and a command signal is issued to the air pump 10, so as to obtain the calculated air amount (step 48).

Figure 9A:
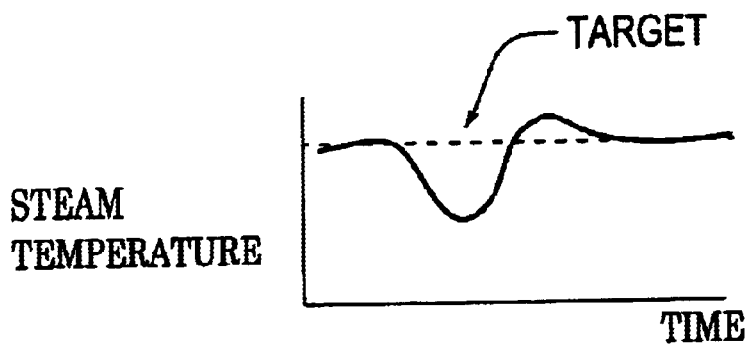
FIG. 9A is a diagram showing changes of reformate fuel steam temperature when the control shown in FIG. 7 is not executed.
Figure 9B:
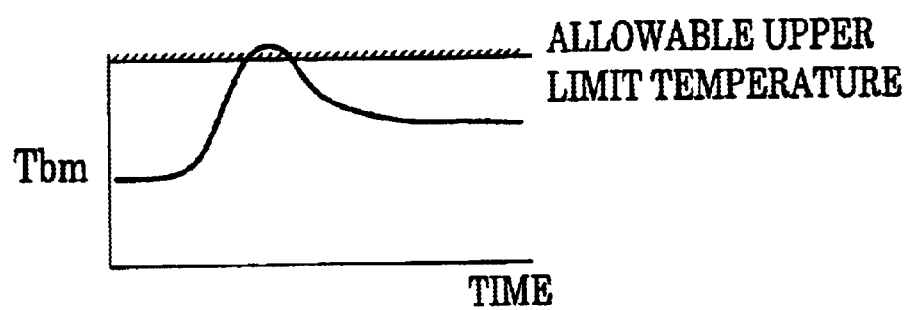
FIG. 9B is a diagram showing changes of representative temperature of the combustion portion when the control shown in FIG. 7 is not executed.
Figure 9C:
FIG. 9C is a diagram showing changes of the emission amount when the control shown in FIG. 7 is not executed.
Figure 9D:
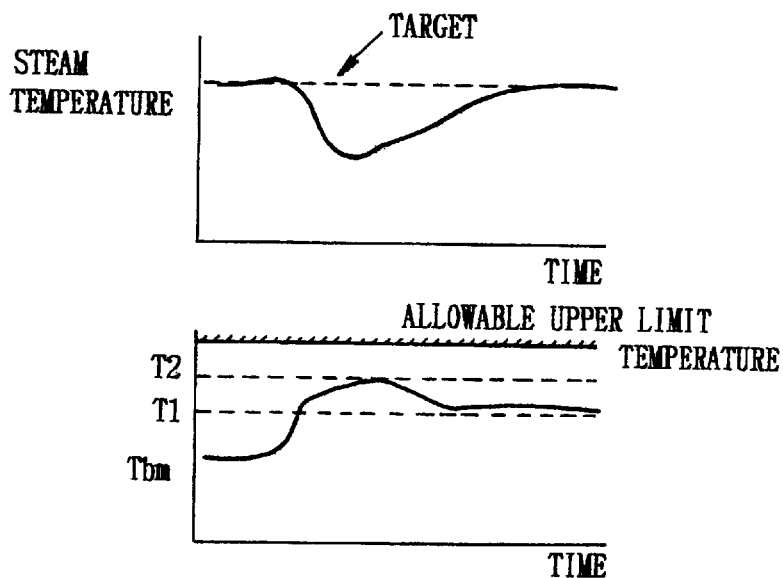
FIG. 9D is a diagram showing changes of reformate fuel steam temperature of the combustion portion when the control shown in FIG. 7 is executed.
Figure 9E:
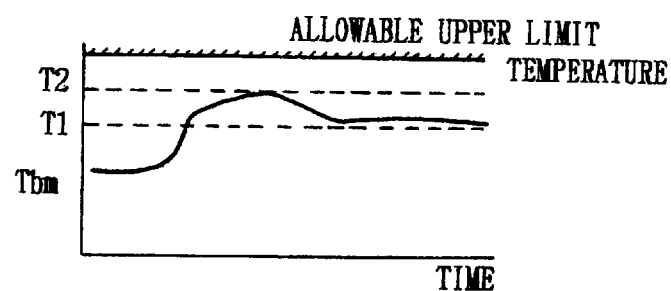
FIG. 9E is a diagram showing changes of representative temperature of the combustion portion when the control shown in FIG. 7 is executed.
Figure 9F:
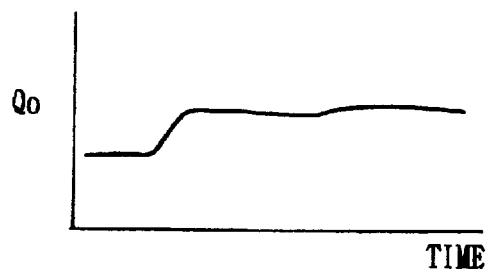
FIG. 9F is a diagram showing changes of the emission amount when the control shown in FIG. 7 is executed.

Changes of representative temperature of the combustion portion 6 in the case of the embodiment of control as shown in FIG. 7 are shown in FIG. 9D, FIG. 9E and FIG. 9F together with a comparative example. FIG. 9A, FIG. 9B and FIG. 9C show a comparative example, showing a case without executing flow rate adjustment. FIG. 9A shows changes of the reformate fuel steam temperature, FIG. 9B shows changes of the representative temperature Tbm of the combustion portion 6 and FIG. 9C shows changes of the emission amount Qo. FIG. 9D, FIG. 9E and FIG. 9F show changes of representative temperature of the combustion portion 6 in the case of executing flow rate adjustment as shown in FIG. 7. FIG. 9D shows changes of the reformate fuel steam temperature, FIG. 9E shows changes of the representative temperature Tbm of the combustion portion 6 and FIG. 9F shows changes of the emission amount Qo. As shown in FIG. 9A, FIG. 9B and FIG. 9C, the comparative example in which along with the decline of the reformate fuel steam temperature, the emission amount Qo is increased, and the representative temperature Tbm of the combustion portion 6 exceeds the allowable upper limit temperature after the specified delay time. By contrast, FIG. 9D, FIG. 9E and FIG. 9F show an example of flow rate adjustment, in which if the emission amount Qo increases due to a decline of the reformate fuel steam temperature, the flow rate is decreased as soon as the representative temperature Tbm becomes higher than the first reference temperature T1, and the heat generation in the combustion portion 6 decreases, and therefore the representative temperature Tbm of the combustion portion 6 does not exceed the allowable upper limit temperature.

Therefore, according to embodiments of the control apparatus for controlling in this manner, if the reformate fuel amount changes due to fluctuations of the load of the fuel cell 1 and accordingly the heat value required in the combustion portion 6 or the supply amount of combustion material changes, a local overheat state in the combustion portion 6 can be avoided, and high-heat damage or other abnormality in the combustion portion 6 can be prevented.

The control apparatus of the invention controls the flow rate of the emission by adjusting the opening degree of the flow rate adjusting valve 23 disposed in the intermediate portion of the return pipe 22 in the state capable of sufficiently heating the reformate fuel by the unreacted flammable gas, that is, when the assist control is not executed. In this case, the target combustion temperature is set according to the target steam temperature of the reformate fuel, and further depending on the target combustion temperature, the emission flow rate is set. At the same time, as mentioned above, the flow rate is adjusted according to the allowable upper limit temperature in the combustion portion 6. This is the same either when using only the unreacted flammable gas as the combustion material or when using it together with the combustion methanol. In this embodiment, the preferred controller is as follows.

Figure 10:
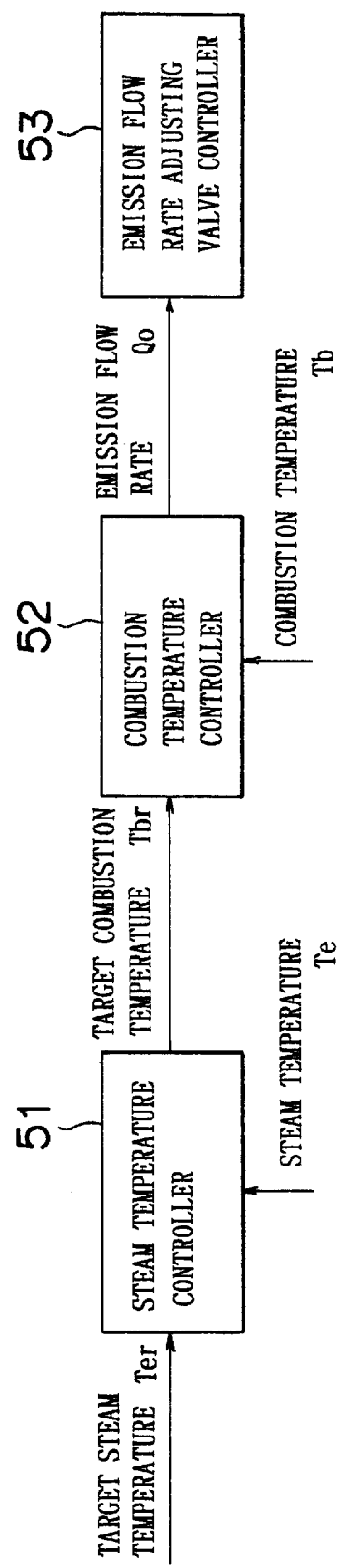
FIG. 10 is a block diagram showing an exemplary embodiment of a controller in a flow rate control system of emission.

FIG. 10 shows an exemplary embodiment of a controller of the emission flow rate, which comprises a steam temperature controller 51, a combustion temperature controller 52, and an emission flow rate adjusting valve controller 53. Each one of these controllers 51, 52, 53 typically comprises a microcomputer, and the steam temperature controller 51 sets the target combustion temperature Tbr so that the steam temperature Te can be the target temperature Ter on the basis of the target steam temperature Ter and the detected reformate fuel steam temperature Te. Herein, the target steam temperature Ter is the temperature on the basis of the active temperature in the reforming portion 4 (for example, about 330° C.).

The combustion temperature controller 52 sets the emission flow rate Qo by calculating on the basis of the input data by receiving the target combustion temperature Tbr from the steam temperature controller 52 and the detected combustion temperature Th. The emission flow rate adjusting valve controller 53 controls the opening degree of the flow rate adjusting valve 23 on the basis of the emission flow rate entered from the combustion temperature controller 52.

Figure 11:
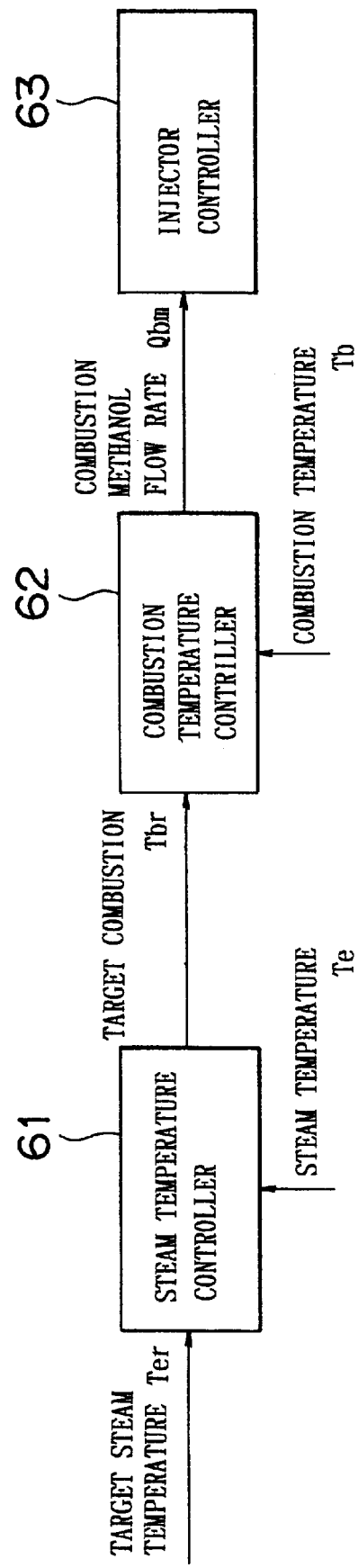
FIG. 11 is a block diagram showing an exemplary embodiment of a controller in a flow rate control system of combustion methanol.

FIG. 11 shows an exemplary embodiment of a controller for flow rate control of the combustion methanol, which comprises a steam temperature controller 61, a combustion temperature controller 62, and an injector controller 63. Each one of these controllers 61, 62, 63 typically comprises a microcomputer, and the steam temperature controller 61 sets the target combustion temperature Tbr so that the steam temperature Te can be the target temperature Tbr on the basis of the target steam temperature Ter and the detected reformate fuel steam temperature Te. Herein, the target steam temperature Ter is the temperature on the basis of the catalyst active temperature in the reforming portion 4 (for example, about 330° C.).

The combustion temperature controller 62 sets the combustion methanol amount Qbm on the basis of the input data by receiving the target combustion temperature Tbr from the steam temperature controller 61 and the detected combustion temperature Tb. The injection controller 63 controls the feed amount of the combustion methanol by the injector 9 on the basis of the combustion methanol amount Qbm entered from the combustion temperature controller 62. Herein, meanwhile, the steam temperature controllers 51, 61, and the combustion temperature controllers 52, 62 may each be used commonly.

Figure 12:
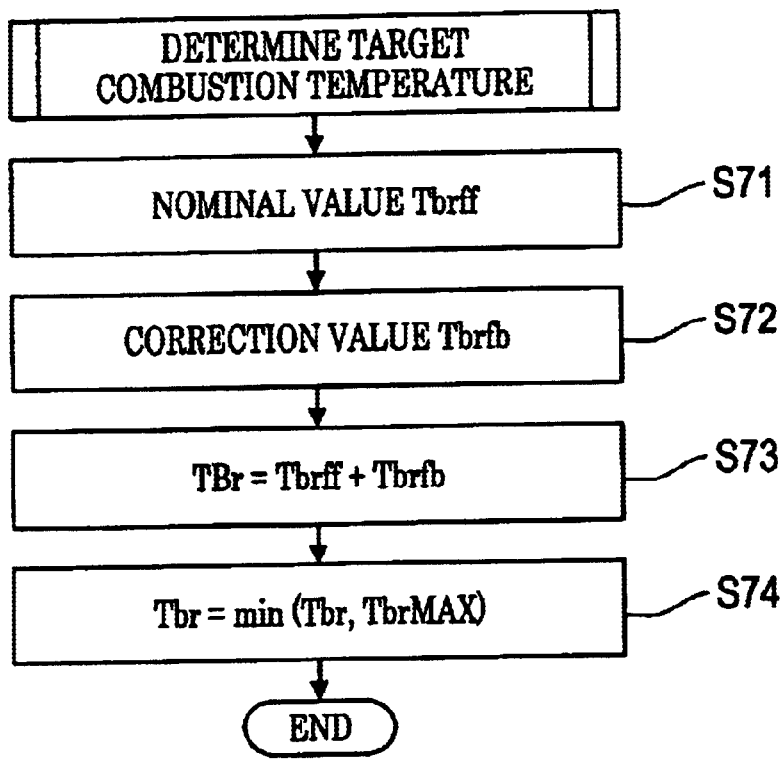
FIG. 12 is a flowchart showing an exemplary embodiment of control to be executed by a steam temperature controller.
Figure 13:
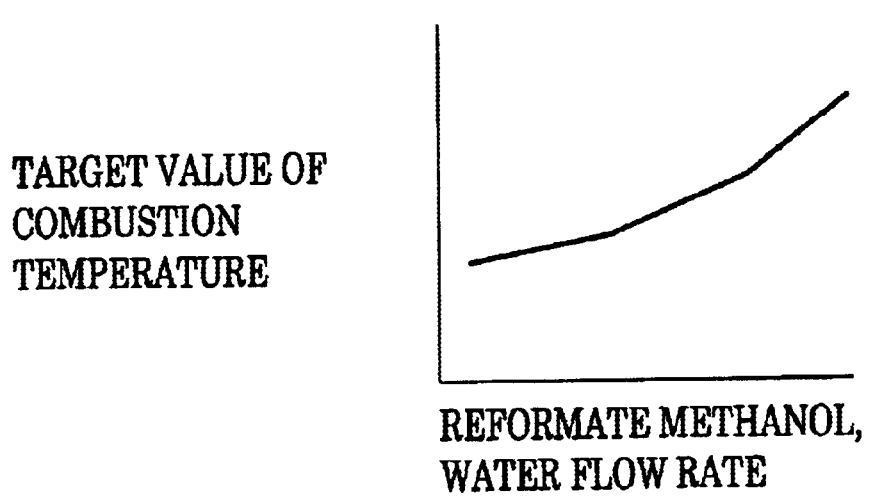
FIG. 13 is a diagram showing an example of a map for determining a combustion temperature target value.

The process of determining the target combustion temperature Thr by the steam temperature controllers 51, 61 is nearly the same, which is shown in FIG. 12. First, the nominal value Tbrff of the target combustion temperature is determined (step 71). This is obtained, for example, from the map shown in FIG. 13. The map shown in FIG. 13 specifies the relationship between the amount of the mixed liquid of reformats methanol and water, and the target value of the combustion temperature required for heating to this target steam temperature Ter, and it is determined by experiment or by calculation of heat value. Therefore, once the flow rate of the reformate fuel is determined, the nominal value Tbrff of the target combustion temperature is determined from this map. As this target combustion temperature, the average temperature or representative temperature of the parts in the combustion portion 6 is employed.

Next, the target combustion temperature is adjusted (step 72). That is, if the target combustion temperature Tbr is set as the nominal value Tbrff, the steam temperature Te may not be the target steam temperature Ter due to a shortage of heat required for generation of heat depending on the ambient temperature, temperature of the reformate fuel, or fluctuations of the device such as flow rate adjusting valve 23 or injector 9. In step S22, the steam temperature Te is adjusted to avoid this. For example, the adjustment value Tbrfb is determined as:

$$Tbrfb=Kpe(Te-Ter)+Kie\Sigma(Te-Ter)$$

where Kpe and Kie are predetermined control parameters, $\Sigma(Te-Ter)$ is the integrated value of the deviation of the target value and detected value of reformate fuel steam. In another adjustment example, adjustment values are determined as follows:

If $Te-Ter<-\epsilon e$, then $$Tbrfb=Tbrfb+\Delta e$$

If $Te-Ter>\epsilon e$, then $$Tbrfb=Tbrfb-\Delta e$$

where $\epsilon e$ and $\Delta e$ are predetermined control parameters.

Next, adding the adjustment value Tbrfb to the nominal value Tbrff, the target combustion temperature Thr is determined (step 73) by:

$$Tbr=Tbrff+Tbrfb$$

Further, to prevent high-heat damage of the combustion portion 6, the upper limit guard is set (step 74). That is, from the Trb determined as:

$$Tbr=min(Tbr,TbrMAX)$$

and the predetermined upper limit value ThrMAX, the smaller value is employed. In the temperature controllers 51, 61, by executing the control in steps 71 to 74, the target combustion temperature Tbr is set.

Figure 14:
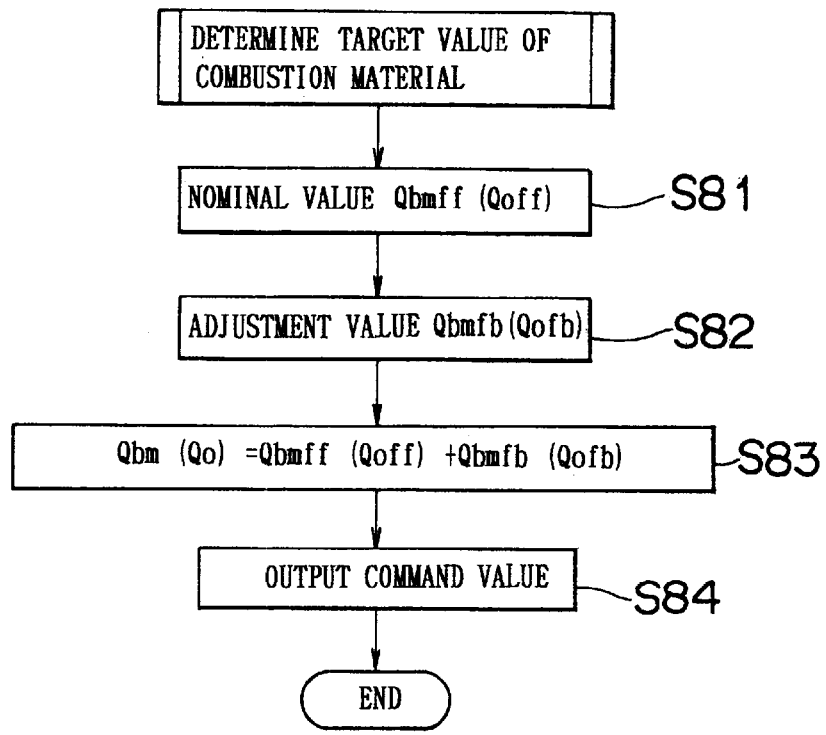
FIG. 14 is a flowchart showing an exemplary embodiment of control to be executed by a combustion temperature controller.
Figure 15:
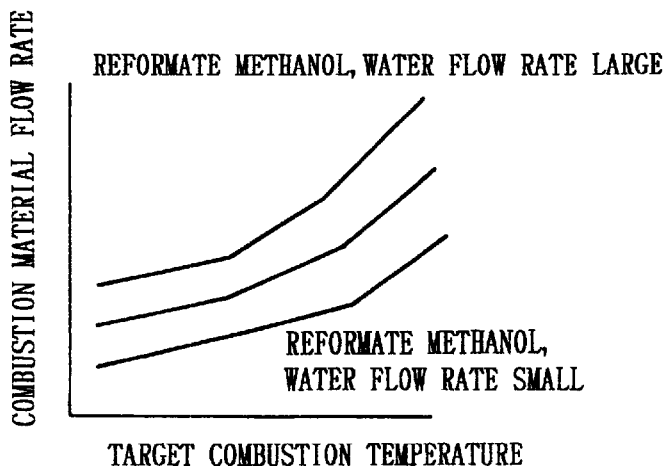
FIG. 15 is a diagram showing an example of a map for determining a fuel material flow rate.
Figure 16:
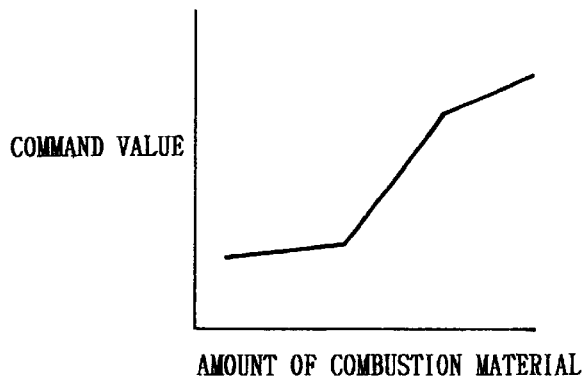
FIG. 16 is a diagram showing an example of a map for determining a command value for obtaining an assessed combustion material amount.

Meanwhile, the calculation process of the emission flow rate and combustion methanol amount in the combustion temperature controllers 52, 62 is similar as shown in FIG. 14. First, the target amount of the emission containing the unreacted flammable gas or the combustion methanol (hereinafter, these are referred to as the "combustion material target") is determined (step 81). It can be obtained from the map, for example, shown in FIG. 15. The map shown in FIG. 15 is a three-dimensional map determining the combustion material flow rate from the target combustion temperature and the amount of mixed liquid of reformate methanol and water. This map is determined either by experiment or by calorific calculation. Therefore, the target combustion temperature is determined according to the routine shown in FIG. 12, and the reformate fuel amount is determined according to the load of the fuel cell 1, and therefore the nominal value Qbmff (Qoff) of the combustion material flow rate is determined from the map shown in FIG. 15.

Corresponding to this nominal value Qbmff (Qoff), the adjustment value Qbmfb (Qofb) is determined (step 82), and it is adjusted by the adjustment value Qbmfb (Qofb) (step 83). These steps 82 and 83 correspond to the steps 72 and 73 shown in FIG. 12, and the adjustment value can be determined and adjusted the same as explained in the steps 72 and 73. That is, the control value, for example, is calculated as $$Qbmfb(Qofb)=Kpb(Tb-Tbr)+Kib\Sigma(Tb-Thr)$$

where Kbp and Kib are predetermined control parameters, $\Sigma(Tb-Tbr)$ is the integrated value of the deviation of the target value and detected value of the combustion temperature. In another adjustment example, adjustment values are determined as follows:

If $Tb-Tbr<-\epsilon b$, then $$Qbmfb(Qofb)=Qbmfb(Qofb)+\Delta b$$

If $Tb-Tbr>\epsilon b$, then $$Qbmfb(Qofb)=Qbmfb(Qofb)-\Delta b$$

where eb and Δb are predetermined control parameters.

Next, adding the adjustment value Qbmfb (Qofb) to the nominal value Qbmff (Qoff), the target combustion material amounts Qbm, Qo are determined (step 83) as follows:

$$Qbm(Qo)=Qbmfb(Qoff)+Qbmfb(Qofb)$$

In order to achieve the thus obtained combustion material flow rate, the opening degree of the flow rate adjusting valve 23 or the injection amount of the injector 9 is controlled (step 84). It can be determined from the map, for example, by determining the relation between the flow rate and command value of the combustion material experimentally with respect to the flow rate adjusting valve 23 and injector 9 and forming a map as shown in FIG. 15.

Therefore, as shown above, the combustion controllers 52, 62 are provided independently, and the flow rate control of the combustion material is executed in consideration of the upper limit temperature in the combustion portion 6 by the combustion temperature controllers 52, 62, thereby preventing an excessively high combustion temperature or high-heat damage of the combustion portion 6. Moreover, because the flow rate control of the combustion material by the combustion temperature controllers 52, 62 is based on the target combustion temperature by the steam temperature controllers 51, 61, the steam temperature of the reformate fuel is adequately controlled, and the reforming efficiency is enhanced, and deterioration of catalyst in the reforming portion 4 can be prevented.

The air supplied into the combustion portion 6 is not particularly preheated, and it functions as a coolant for the combustion portion 6. The air introduced into the combustion portion 6 is raised in temperature by combustion, and flows into the exhaust side in this state, so that the heat is carried into the exhaust side. As a result, depending on the manner of feed of air, the temperature distribution in the combustion portion 6 varies, and hence the air can be used in control of temperature distribution in the combustion portion 6. Such example is explained below.

Figure 17:
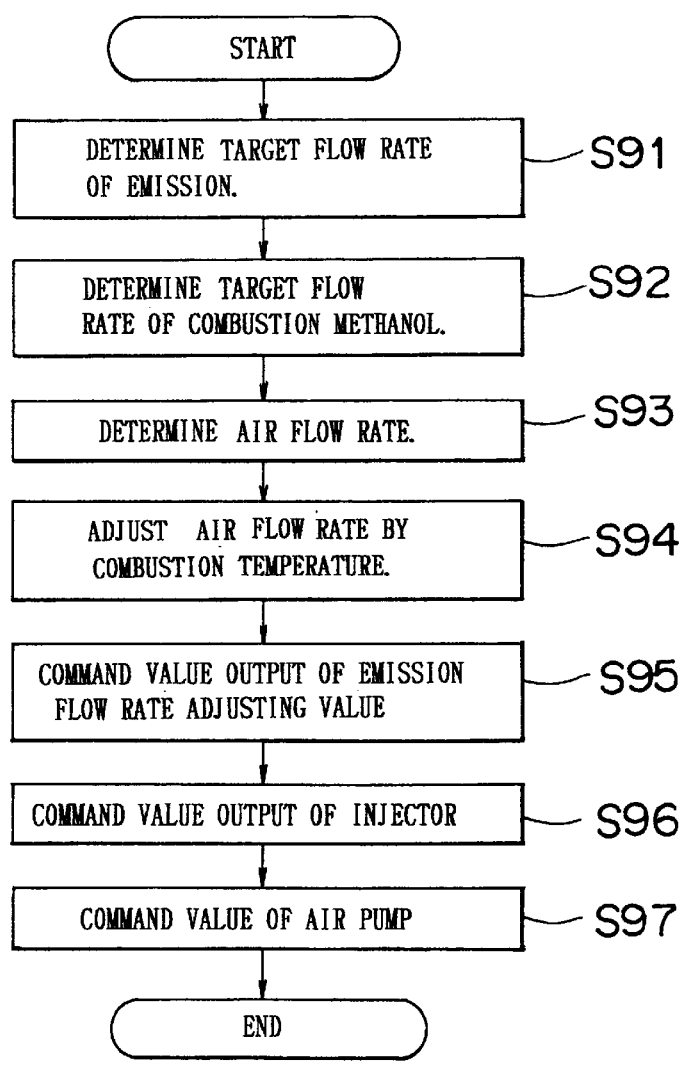
FIG. 17 is a flowchart showing another exemplary embodiment of control to be executed by a control apparatus of the invention.

When heating the reformate fuel by the heat generated in the combustion portion 6, as mentioned above, a specified command value is issued to the flow rate adjusting valve 23, injector 9 or air pump 10 in order to realize the flow rates by determining the flow rate of the emission including the unreacted flammable gas, amount of combustion methanol, and the amount of air required for combustion, on the basis of the reformate fuel amount or its target steam temperature. The control example shown in FIG. 17 also adjusts the flow rate on the basis of the detected temperature of the combustion portion.

More specifically, determination of the target flow rate of the emission (step 91), determination of the target flow rate of the combustion methanol (step 92), and determination of the air flow rate (step 93) are executed in the same way as explained in FIG. 7. Then, the air flow rate is adjusted (step 94).

Figure 18:
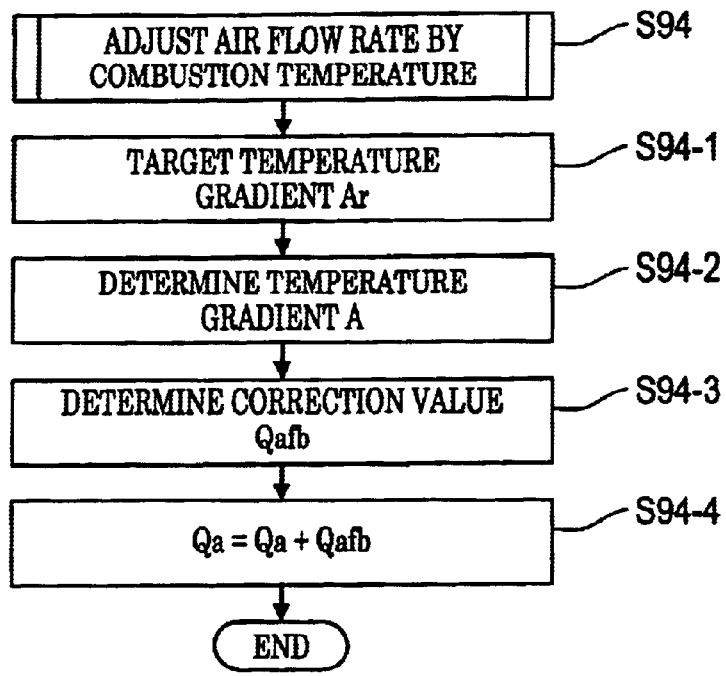
FIG. 18 is a flowchart showing an exemplary embodiment of a sub-routine for adjusting the air flow rate.
Figure 19:
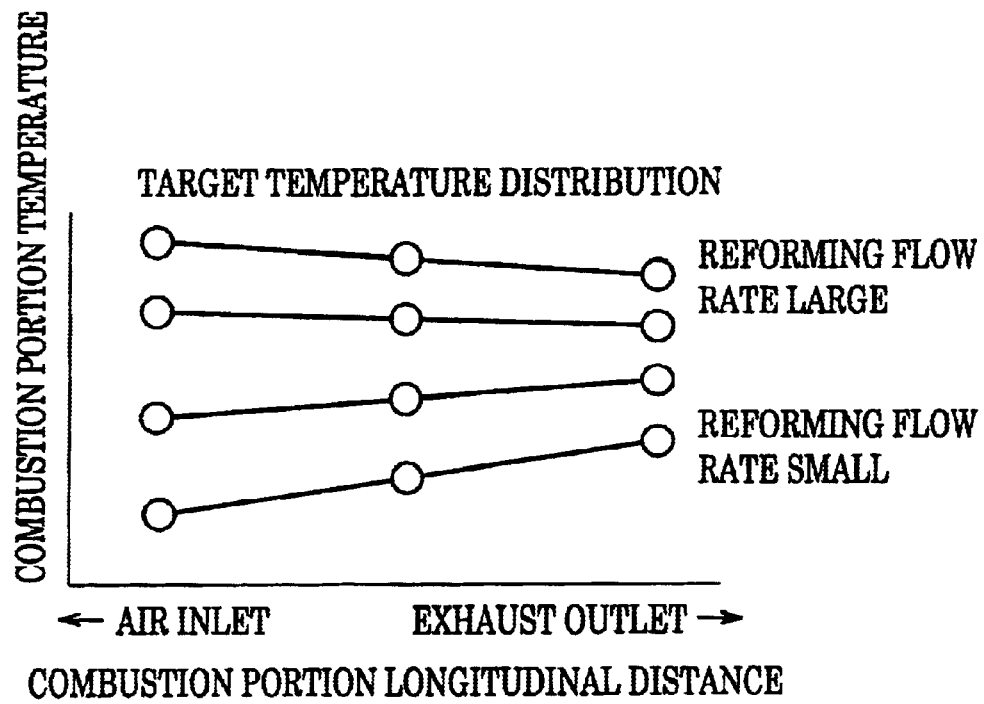
FIG. 19 is a diagram showing an example of a map for a target temperature gradient at the combustion portion.

A sub-routine of this step 94 is shown in FIG. 18. First, the target temperature gradient Ar in the combustion portion 6 is determined (step 94-1). That is, the target combustion temperature distribution in the longitudinal direction in the combustion portion 6 (the direction from the inflow side to the exhaust side of the air and combustion material) is determined by experiment or by thermal calculation in each flow rate of the reformate fuel. The temperature distribution is approximately linear, and the slope is obtained as the target temperature gradient Ar. An example of a thus set map of temperature distribution is shown in FIG. 19.

On the other hand, by linearly approximating the temperatures Tb1, Tb2, . . . , Tbn of the parts of the combustion portion 6 detected by the temperature sensors 32, the gradient A of the temperature distribution is determined (step S94-2). The linear approximation is achieved, for example, by the method of least squares.

On the basis of thus obtained temperature gradient A and target temperature gradient Ar, the adjustment amount of air Qafb is determined (step 94-3). For example, (i) In the case of $$A-Ar>\epsilon, \; Qafb=max(Qafb-\Delta, \; QafbMIN)$$

(ii) in the case of $$A-Ar<-\epsilon, \; Qafb=min(Qafb-\Delta, \; QafbMAX)$$

where ε and Δ are control parameters.

That is, in the case of (i), the temperature of the exhaust side (downstream side) is high, and in this case, the larger value of either the value by subtracting the specified value Δ or the adjustment minimum value QafbMIN is employed as the adjustment value Qafb. In the case of (ii), the temperature of the exhaust side (downstream side) is low, and in this case, the smaller value of either the value by adding the specified value Δ or the adjustment maximum value QafbMAX is employed as the adjustment value Qafb. By adding the adjustment value Qafb to the air amount Qa determined in step 93, the air amount is adjusted (step 94-4).

In succession, command signals are issued to the flow rate adjusting valve 23, injector 9, and air pump 10 (steps 95, 96, 97) such that the emission amount, combustion methanol amount and air amount may be the values determined above.

By controlling in this manner, if the air inflow side temperature is high, the air supply amount is increased, and the inflow side temperature is lowered by its cooling action, and the exhaust side temperature is raised. In the opposite case, the air inflow amount is decreased, and the inflow side temperature is higher, and the exhaust side temperature drops, so that the temperature is adjusted to the target distribution. That is, local temperature elevation in the combustion portion 6 is prevented, and high-heat loss or other inconvenience of the combustion portion 6 can be avoided.

In the foregoing examples, the invention is applied to the control apparatus for the reformer that feeds fuel to the fuel cell 1, but the invention is not limited to the illustrated examples alone, and the device for feeding reformate gas, that is, the energy converter may be selected as required. As the reformate fuel, methanol and water are shown, but embodiments of the reformer of the invention can also be used to reform other hydrocarbon. Further in the illustrated examples, the required amount of the reforming reaction is the amount of the reformate fuel to be supplied into the reforming portion. However, according to the invention, other parameters in corresponding relation to the reformate fuel amount, for example, the current as the load to the fuel cell 1 can be also used as the required amount of the reforming reaction. In the foregoing examples, the heating portion is structured as shown in FIG. 21, but the heating portion in the reformer in the invention is not particularly limited in structure, so long as it can heat the reformate fuel by the heat accompanying the oxidation of heating fuel, and thus it is not limited in structure to the structure shown in FIG. 21. Moreover, the heating fuel usable in the invention is not limited to methanol, and various other fuels can also be used as desired for heating the reformate fuel.

The illustrated examples relate to the reformer for feeding air to the reformer to cause a partial oxidation reaction, and producing the heat suited to the endothermic amount in the reforming reaction by a partial oxidation reaction, and maintaining the temperature of the reforming portion substantially at a constant level. Although the invention is particularly effective when applied to the reformer for this kind of partial oxidation reaction, it can be also applied to the control apparatus for the reformer of the type that does not produce a partial oxidation reaction.

In the above described embodiments, the various controllers that are described are implemented as programmed general purpose computers. It will be appreciated by those skilled in the art, however, that the controller can be implemented using a single special purpose integrated circuit (e.g., ASIC) having a main or central processor section for overall, system-level control, and separate sections dedicated to performing various different specific computations, functions and other processes under control of the central processor section. The controllers also can be a plurality of separate dedicated or programmable integrated or other electronic circuits or devices (e.g., hardwired electronic or logic circuits such as discrete element circuits, or programmable logic devices such as PLDs, PLAs, PALs or the like). The controllers can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the programs shown in FIGS. 1, 2, 3, 5, 7, 12, 14, 17 and 18 can be used as controllers in the control apparatus. A distributed processing architecture can be used for maximum data/signal processing capability and speed.

While the present invention has been described with reference to what is presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A control apparatus for a reformer comprising a reformate gas generator that includes a reforming portion that reforms reforming fuel by a reforming reaction, and a combustion portion that heats the reforming fuel by burning emission containing unreacted flammable gas produced by an energy converter utilizing reformed fuel from the reformer, wherein the combustion portion supplies heat into a vaporizing portion that evaporates the reforming fuel and supplies vaporized reforming fuel into the reforming portion, the vaporizing portion being separate from the combustion portion and the heat produced by the combustion portion being transmitted to the vaporizing portion, the control apparatus comprising:

a reforming rate assessing device that assesses an amount of the reforming fuel to be evaporated by the vaporizing portion and reformed by the reforming portion;

an emission amount assessing device that assesses an amount of the emission to be supplied to the combustion portion based on the amount of the reforming fuel to be reformed by the reforming portion as assessed by the reforming rate assessing device; and a flow control device that adjusts the amount of the emission supplied to the combustion portion, the flow control device being controlled based on the amount of the reforming fuel to be reformed so that the assessed amount of the emission is supplied to the combustion portion via the flow control device.

2. The control apparatus according to claim 1, further comprising:

a heat value determination device that determines a shortage in an amount of heat to be needed to heat the reforming fuel by the combustion portion when burning the emission containing unreacted flammable gas in the combustion portion; and a fuel supplying device that increases a fuel flow into the combustion portion when the shortage in the amount of heat is determined.

3. The control apparatus according to claim 2, further comprising:

a combustion portion temperature detector that detects a temperature of the combustion portion; and a heating fuel adjuster that adjusts an amount of the heating fuel to be burned in the combustion portion based on the temperature of the combustion portion detected by the combustion portion temperature detector.

4. The control apparatus according to claim 2, further comprising:

a reforming fuel temperature detector that detects a temperature of the reforming fuel heated in the combustion portion; and a heating fuel arrester that stops supply of the heating fuel to the combustion portion when the temperature of the reforming fuel detected by the reforming fuel temperature detector exceeds a predetermined temperature.

5. The control apparatus according to claim 1, further comprising:

a reforming fuel temperature detector that detects a temperature of the reforming fuel heated by the combustion portion; and an adjuster that adjusts an amount of the emission to be supplied into the reformer based on the temperature of the reforming fuel detected by the reforming fuel temperature detector.

6. The control apparatus according to claim 1, further comprising:

an adjuster that adjusts an amount of the emission to be supplied into the reformer on the basis of a time delay in time period from the timing when the reforming fuel is introduced into the reformer to the timing when the reforming fuel is completed to gasify in the vaporizing portion.

7. The control apparatus according to claim 1, further comprising:

a combustion portion temperature detector that detects a temperature of the combustion portion; and an emission adjuster that adjusts an amount of the emission burned in the combustion portion based on the temperature of the combustion portion detected by the combustion temperature detector.

8. The control apparatus according to claim 1, further comprising:
a combustion aid gas amount assessing device that assesses a first amount of a combustion aid gas for burning the unreacted flammable gas in the emission supplied into the combustion portion, based on an amount of the unreacted flammable gas burned in the combustion portion.

9. The control apparatus according to claim 8, further comprising:
a heating temperature detector that detects a temperature for heating the reformate fuel supplied for undergoing a reforming reaction; and
an adjuster that adjusts an amount of the combustion aid gas to be supplied into the combustion portion based on the temperature detected by the heating temperature detector.

10. The control apparatus according to claim 8, further comprising:
an adjuster that adjusts an amount of the combustion aid gas to be supplied into the reformate gas generator, based on the delay in time period from the timing when the reforming fuel is introduced into the reformate gas generator to the timing when the reforming is completed to gasify in the vaporizing portion.

11. The control apparatus according to claim 8, further comprising:
a detector that detects a ratio of an amount of the unreacted flammable gas burned for heating the reforming fuel to an amount of the combustion aid gas for burning the flammable gas; and
an adjuster that adjusts an amount of the emission to be supplied into the reformer on the basis of the ratio detected by the detector.

12. The control apparatus according to claim 8, further comprising:
a first temperature detector that detects a temperature of combustion aid gas at a point prior to supply of the combustion aid gas into the combustion portion;
a second temperature detector that detects a temperature at a point of exhaust of the combustion aid gas from the combustion portion; and
a combustion aid gas amount controller that increases a second amount of the combustion aid gas supplied to the combustion portion when the temperature detected by the first temperature detector is higher than the temperature detected by the second temperature detector, and decreases the second amount of the combustion aid gas supplied to the combustion portion when the temperature detected by the first temperature detector is lower than the temperature detected by the second temperature detector.

13. A reformer unit controlled by the control apparatus according to claim 1.

14. A control apparatus for a reformer comprising a reformate gas generator that includes a reforming portion that reforms reforming fuel by a reforming reaction, and a combustion portion that heats the reforming fuel by burning an unreacted flammable gas produced by an energy converter utilizing reformed fuel from the reformer, wherein the combustion portion supplies heat into a vaporizing portion that evaporates the reforming fuel and supplies vaporized reforming fuel into the reforming portion, the vaporizing portion being separate from the combustion portion and the heat produced by the combustion portion being transmitted to the vaporizing portion, the control apparatus comprising:
a reforming rate assessing device that assesses an amount of the reforming fuel to be evaporated by the vaporizing portion and reformed by the reforming portion;
a flammable gas amount assessing device that assesses an amount of flammable gas needed to be supplied into the combustion portion based on the amount of the reforming fuel to be reformed by the reforming portion as assessed by the reforming amount assessing device;
an emission amount assessing device that assesses an amount of the unreacted flammable gas to be supplied to the combustion portion based on the assessed amount of the flammable gas needed; and
a flow control device that adjusts the amount of the emission supplied to the combustion portion, the flow control device being controlled based on the amount of the flammable gas needed so that the assessed amount of emission is supplied to the combustion portion via the flow control device.

15. The control apparatus according to claim 14, further comprising:
a combustion aid gas amount assessing device that assesses an amount of combustion aid gas to be supplied into the combustion portion with the unreacted flammable gas, based on the amount of the unreacted flammable gas amount assessed by the flammable gas amount assessing device.

16. A reformer unit controlled by the control apparatus according to claim 14.

17. A control apparatus for a reformer comprising a reformate gas generator that includes a reforming portion that reforms reforming fuel by a reforming reaction, and a combustion portion that heats the reforming fuel by burning emission containing unreacted flammable gas produced when reforming fuel is reacted to obtain an electric energy, wherein the combustion portion supplies heat into a vaporizing portion that evaporates the reforming fuel and supplies vaporized reforming fuel into the reforming portion, the vaporizing portion being separate from the combustion portion and the heat produced by the combustion portion being transmitted to the vaporizing portion, the control apparatus comprising:
a reforming rate assessing device that assesses an amount of the reforming fuel to be evaporated by the vaporizing portion and reformed by the reforming portion;
an emission amount assessing device that assesses an amount of the emission to be supplied to the combustion portion based on the amount of the reforming fuel to be reformed by the reforming portion as assessed by the reforming rate assessing device; and
a flammable gas amount estimator that estimates an amount of the unreacted flammable gas in the emission based on (i) an amount of the reforming fuel reformed for supply into an energy converter and on (ii) a load of the energy converter.

* * * * *